(12) United States Patent
Carrilho et al.

(10) Patent No.: US 8,628,729 B2
(45) Date of Patent: Jan. 14, 2014

(54) THREE-DIMENSIONAL MICROFLUIDIC DEVICES

(75) Inventors: Emanuel Carrilho, Chestnut Hill, MA (US); Andres W. Martinez, Cambridge, MA (US); Katherine A. Mirica, Cambridge, MA (US); Scott T. Phillips, Cambridge, MA (US); Adam C. Siegel, Cambridge, MA (US); Benjamin Wiley, Somerville, MA (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 42 days.

(21) Appl. No.: 12/934,499

(22) PCT Filed: Mar. 27, 2009

(86) PCT No.: PCT/US2009/038693
§ 371 (c)(1),
(2), (4) Date: Dec. 14, 2010

(87) PCT Pub. No.: WO2009/121037
PCT Pub. Date: Oct. 1, 2009

(65) Prior Publication Data
US 2011/0123398 A1    May 26, 2011

Related U.S. Application Data

(60) Provisional application No. 61/072,049, filed on Mar. 27, 2008.

(51) Int. Cl.
*G01N 21/75* (2006.01)

(52) U.S. Cl.
USPC ....... 422/420; 422/52; 422/82.05; 422/82.06; 422/82.07; 422/82.08; 422/82.09; 422/82.11; 422/407; 422/501; 422/502; 422/503; 436/164; 436/165; 436/172; 436/174; 436/518; 436/805; 436/809; 435/164; 435/165; 435/283.1; 435/287.1; 435/287.7; 435/288.7; 435/808; 435/4; 435/5; 435/7.2; 435/7.9

(58) Field of Classification Search
USPC .............. 422/52, 82.05, 82.06, 82.07, 82.08, 422/82.09, 82.11, 407, 501, 502, 503, 420, 422/507; 435/164, 165, 283.1, 287.1, 435/287.2, 288.7, 808, 4, 5, 7.2, 7.9; 436/164, 165, 172, 174, 518, 805, 809
See application file for complete search history.

(56) References Cited

U.S. PATENT DOCUMENTS

| 4,618,475 A | 10/1986 | Wang |
| 4,668,564 A | 5/1987 | Orchard |

(Continued)

FOREIGN PATENT DOCUMENTS

| EP | 2143491 | 1/2010 |
| JP | 08233799 A | 9/1996 |

(Continued)

OTHER PUBLICATIONS

Derda, et al., "Paper-supported 3D Cell Culture for Tissue-Based Bioassays," PNAS, vol. 106, No. 44, Nov. 2009, pp. 18457-18462.

(Continued)

*Primary Examiner* — Dennis M White
(74) *Attorney, Agent, or Firm* — Wilmer Cutler Pickering Hale and Dorr LLP

(57) ABSTRACT

Three-dimensional microfluidic devices including by a plurality of patterned porous, hydrophilic layers and a fluid-impermeable layer disposed between every two adjacent patterned porous, hydrophilic layers are described. Each patterned porous, hydrophilic layer has a fluid-impermeable barrier which substantially permeates the thickness of the porous, hydrophilic layer and defines boundaries of one or more hydrophilic regions within the patterned porous, hydrophilic layer. The fluid-impermeable layer has openings which are aligned with at least part of the hydrophilic region within at least one adjacent patterned porous, hydrophilic layer. Microfluidic assay device, microfluidic mixer, microfluidic flow control device are also described.

22 Claims, 25 Drawing Sheets

(56) References Cited

U.S. PATENT DOCUMENTS

| | | |
|---|---|---|
| 4,668,619 A | 5/1987 | Greenquist et al. |
| 4,743,530 A | 5/1988 | Farid et al. |
| 4,757,004 A | 7/1988 | Houts et al. |
| 4,861,711 A | 8/1989 | Friesen et al. |
| 5,120,544 A | 6/1992 | Henley |
| 5,209,904 A | 5/1993 | Forney et al. |
| 5,266,179 A | 11/1993 | Nankai et al. |
| 5,279,944 A | 1/1994 | Fabrizi et al. |
| 5,409,664 A | 4/1995 | Allen |
| 5,648,252 A | 7/1997 | Dumitriu et al. |
| 5,707,818 A | 1/1998 | Chudzik et al. |
| 5,834,226 A | 11/1998 | Maupin |
| 5,858,392 A | 1/1999 | Dumitriu et al. |
| 5,869,172 A | 2/1999 | Caldwell |
| 5,897,522 A | 4/1999 | Nitzan |
| 5,906,934 A | 5/1999 | Grande et al. |
| 5,925,259 A | 7/1999 | Biebuyck et al. |
| 5,941,862 A | 8/1999 | Haynes et al. |
| 6,004,442 A | 12/1999 | Choulga et al. |
| 6,025,203 A | 2/2000 | Vetter et al. |
| 6,060,534 A | 5/2000 | Ronan et al. |
| 6,180,239 B1 | 1/2001 | Whitesides et al. |
| 6,202,471 B1 | 3/2001 | Yadav et al. |
| 6,210,907 B1 | 4/2001 | Cha |
| 6,284,072 B1 | 9/2001 | Ryan et al. |
| 6,319,310 B1 | 11/2001 | Wong et al. |
| 6,391,523 B1 | 5/2002 | Hurditch et al. |
| 6,416,642 B1 | 7/2002 | Alajoki et al. |
| 6,440,645 B1 | 8/2002 | Yon-Hin et al. |
| 6,440,725 B1 | 8/2002 | Pourahmadi et al. |
| 6,478,938 B1 | 11/2002 | Paek et al. |
| 6,566,575 B1 | 5/2003 | Stickels et al. |
| 6,642,408 B2 | 11/2003 | Batlaw et al. |
| 6,761,962 B2 | 7/2004 | Bentsen et al. |
| 6,783,735 B2 | 8/2004 | Vanmaele et al. |
| 6,816,125 B2 | 11/2004 | Kuhns et al. |
| 6,844,200 B2 | 1/2005 | Brock |
| 6,877,892 B2 | 4/2005 | Karp |
| 6,880,576 B2 | 4/2005 | Karp et al. |
| 6,887,701 B2 | 5/2005 | Anderson et al. |
| 6,919,046 B2 | 7/2005 | O'Connor et al. |
| 6,931,523 B1 | 8/2005 | Tomoson et al. |
| 6,935,772 B2 | 8/2005 | Karp et al. |
| 6,951,682 B1 | 10/2005 | Zebala |
| 6,951,757 B2 | 10/2005 | Sabatini |
| 6,989,128 B2 | 1/2006 | Alajoki et al. |
| 7,008,799 B1 | 3/2006 | Zimmer et al. |
| 7,186,352 B2 | 3/2007 | Morse et al. |
| 7,192,693 B2 | 3/2007 | Bryant |
| 7,291,857 B2 | 11/2007 | Tanaka et al. |
| 7,303,923 B2 | 12/2007 | Hardman et al. |
| 8,206,992 B2 | 6/2012 | Reches et al. |
| 2002/0187074 A1* | 12/2002 | O'Connor et al. ......... 422/82.05 |
| 2002/0187560 A1* | 12/2002 | Pezzuto et al. ............. 436/180 |
| 2003/0032203 A1 | 2/2003 | Sabatini et al. |
| 2003/0148401 A1 | 8/2003 | Agrawal et al. |
| 2004/0067166 A1 | 4/2004 | Karinka et al. |
| 2004/0103808 A1 | 6/2004 | Lochun et al. |
| 2004/0119070 A1 | 6/2004 | Roach et al. |
| 2005/0136501 A1 | 6/2005 | Kuriger |
| 2005/0145496 A1 | 7/2005 | Goodsaid et al. |
| 2005/0169962 A1 | 8/2005 | Bhatia et al. |
| 2005/0196702 A1 | 9/2005 | Bryant et al. |
| 2005/0266582 A1 | 12/2005 | Modlin et al. |
| 2006/0014003 A1 | 1/2006 | Libera et al. |
| 2006/0038182 A1 | 2/2006 | Rogers et al. |
| 2006/0088857 A1 | 4/2006 | Attiya et al. |
| 2006/0130054 A1 | 6/2006 | Bocking et al. |
| 2006/0226575 A1 | 10/2006 | Maghribi et al. |
| 2007/0179117 A1 | 8/2007 | Reiner et al. |
| 2007/0196819 A1 | 8/2007 | Asberg et al. |
| 2007/0224701 A1 | 9/2007 | Rosenstein |
| 2007/0278097 A1 | 12/2007 | Bhullar et al. |
| 2007/0298433 A1 | 12/2007 | Sia et al. |
| 2009/0298191 A1 | 12/2009 | Whitesides et al. |
| 2011/0111517 A1 | 5/2011 | Siegel et al. |
| 2011/0189786 A1 | 8/2011 | Reches et al. |
| 2012/0181184 A1 | 7/2012 | Whitesides et al. |
| 2012/0198684 A1 | 8/2012 | Carrilho et al. |

FOREIGN PATENT DOCUMENTS

| | | |
|---|---|---|
| WO | WO-97/48257 | 12/1997 |
| WO | WO-99/46644 | 9/1999 |
| WO | WO-00/33078 | 6/2000 |
| WO | WO-01/02093 A2 | 1/2001 |
| WO | WO-01/25138 | 4/2001 |
| WO | WO-03/015890 A1 | 2/2003 |
| WO | WO-2004/006291 A2 | 1/2004 |
| WO | WO-2004/080138 | 9/2004 |
| WO | WO-2005/090975 | 9/2005 |
| WO | WO-2005/090983 A2 | 9/2005 |
| WO | WO-2005/107938 | 11/2005 |
| WO | WO-2005/109005 A1 | 11/2005 |
| WO | WO-2006/018044 | 2/2006 |
| WO | WO-2006/076703 | 7/2006 |
| WO | WO-2007/029250 | 3/2007 |
| WO | WO-2007/081848 | 7/2007 |
| WO | WO-2007/116056 | 10/2007 |
| WO | WO-2008/049083 | 4/2008 |
| WO | WO-2009/120963 | 10/2009 |
| WO | WO-2009/121037 A2 | 10/2009 |
| WO | WO-2009/121038 | 10/2009 |
| WO | WO-2009/121041 A2 | 10/2009 |
| WO | WO-2009/121043 A2 | 10/2009 |
| WO | WO-2010/022324 A2 | 2/2010 |
| WO | WO-2010/102279 A1 | 9/2010 |
| WO | WO-2010/102294 A1 | 9/2010 |
| WO | WO-2011/097412 | 8/2011 |

OTHER PUBLICATIONS

Supplementary European Search Report and Written Opinion for European Application No. 09724164 dated Mar. 16, 2011, 7 pages.

Aikio, et al., "Bioactive Paper and Fibre Products: Patent and Literary Survey," VTT Working Papers 51, VTT-Work-51, 2006, 84 pages.

Author Unknown, "Focus: Lab on Paper, DOI: 10.1039/b814043j," Lab Chip, vol. 8, No. 12, Dec. 2008, pp. 1988-1991, XP002585318, The Royal Society of Chemistry.

Berggren, et al., "Paper Electronics and Electronic Paper," IEEE, Section 12: Flexible Systems, 2001, pp. 300-303.

Bracher, et al., "Heterogeneous Films of Ionotropic Hydrogels Fabricated from Delivery Templates of Patterned Paper," Adv. Mater., 2008, pp. 1807-1812.

Brooks, et al., "A Simple Artificial Urine for the Growth of Urinary Pathogens," Lett. Appl. Microbiol., 1997, 24, pp. 203-206.

Bruzewicz, et al., "Low-Cost Printing of Poly(dimethylsiloxane) Barriers to Define Microchannels in Paper," Anal. Chem., 2008, 80, pp. 3387-3392.

Bruzewicz, et al., "Paper: Fabrication of a Modular Tissue Construct in a Microfluidic Chip," Lab Chip, 2008, 8, pp. 663-671.

Campana, et al., "Double and Triple Staining Methods for Studying the Proliferative Activity of Human B and T Lymphoid Cells," Journal of Immunological Methods, 107, 1988, pp. 79-88.

Carrilho, et al., "Paper Microzone Plates," Analytical Chemistry, vol. 81, No. 15, Aug. 2009, pp. 5990-5998.

Carrilho, et al., "Understanding Wax Printing: A Simple Micropatterning Process for Paper-Based Microfluidics," Analytical Chemistry, vol. 81, No. 16, Aug. 2009, pp. 7091-7095.

Chadee, et al., "Increased Phosphorylation of Histone H1 in Mouse Fibroblasts Transformed with Oncogenes or Constitutively Active Mitogen-Activated Protein Kinase Kinase," The Journal of Biological Chemistry, vol. 270, No. 34, Aug. 1995, pp. 20098-20105.

Cheng, et al., "Clinical Analytics: Paper-Based ELISA**," Agnew. Chem., 2010, 122, pp. 1-5.

Chin, et al., "Lab-on-a-chip Devices for Global Health: Past Studies and Future Opportunities," Lab Chip, 2007, 7, pp. 41-57, A Journal of the Royal Society of Chemistry.

Costerton, et al., "Bacterial Biofilms: a Common Cause of Persistent Infections," Science Mag., 1999, pp. 1318-1322.

(56) References Cited

OTHER PUBLICATIONS

Daar, et al., "Top Ten Biotechnologies for Improving Health in Developing Countries," Nature Genetics, vol. 32, Oct. 2002, pp. 229-232.

Donlan, "Biofilm Formation: A Clinically Relevant Microbiological Process," Healthcare Epidemiology, CID 2001:33, Oct. 2001, pp. 1387-1392.

Donlan, et al., "Biofilm Formation on Cast Iron Substrata in Water Distribution Systems," Wat. Res. vol. 28, No. 6, pp. 1497-1503, 1994.

Donlan, et al., "Reviews: Biofilms: Survival Mechanisms of Clinically Relevant Microorganisms," Clinical Microbiology Reviews, vol. 15, No. 2, Apr. 2002, pp. 167-193.

Dungchai, et al., "Electrochemical Detection for Paper-Based Microfluidics," Anal. Chem., 2009, 81, pp. 5821-5826.

Ebling, "The Permanent Life of Connective Tissue Outside of the Organism," J. Exp. Med., 17, 1913, 15 pages.

Harison, et al., "Methodology Article: High-Throughput Metal Susceptibility Testing of Microbial Biofilms," BMC Microbiology, 2005, 5:53, 11 pages.

International Search Report and Written Opinion of the International Searching Authority, the European Patent Office, for International Application No. PCT/US2007/081848, dated Jan. 28, 2009, 12 pages.

International Search Report and Written Opinion of the International Searching Authority, the European Patent Office, for PCT/US2010/026499, dated Jun. 16, 2010, 2 pages.

International Search Report and Written Opinion of the International Searching Authority, the Korean Intellectual Property Office, for International Application No. PCT/US2009/038566, dated Dec. 16, 2009, 10 pages.

International Search Report and Written Opinion of the International Searching Authority, the Korean Intellectual Property Office, for International Application No. PCT/US2009/038694 dated Nov. 12, 2009, 10 pages.

International Search Report and Written Opinion of the International Searching Authority, the Korean Intellectual Property Office, for PCT/US2009/038693, dated Oct. 28, 2009, 8 pages.

International Search Report and Written Opinion of the International Searching Authority, the Korean Intellectual Property Office, for PCT/US2009/038699, dated Oct. 28, 2009, 9 pages.

International Search Report and Written Opinion of the International Searching Authority, the Korean Intellectual Property Office, for PCT/US2009/038702, dated Nov. 11, 2009, 7 pages.

International Search Report of the International Searching Authority, the European Patent Office, for PCT/US2010/026547, dated Jul. 19, 2010, 3 pages.

International Search Report of the International Searching Authority, the Korean Intellectual Property Office, for PCT/US2009/054601, dated Mar. 22, 2010, 2 pages.

Klajn, et al., "Multicolour Micropatterning of Thin Films and Dry Gels," Nature Materials, vol. 3, Oct. 2004, pp. 729-735.

Lahav, et al., "DO1: 10.1002/adma.200601843—Patterning of Poly(acrylic acid) by Ionic Exchange Reactions in Microfluidic Channels**," Advanced Materials, 2006, 18, pp. 3174-3178.

Leary, et al., "Rapid and Sensitive Colorimetric Method for Visualizing Biotin-Labeled DNA Probes Hybridized to DNA or RNA Immobilized on Nitrocellulose: Bio-Blots," PNAS, vol. 80, No. 13, 1983, pp. 4045-4049.

Li, et al., "Thread as a Versatile Material for Low-Cost Microfluidic Diagnostics," Applied Materials & Interfaces, vol. 2, No. 1, Jan. 2010, 6 pages.

Liu, et al., "Three-Dimensional Photopatterning of Hydrogels Containing Living Cells," Biomed. Microdevices, 2002, 4, pp. 257-266.

Lu, et al., "Short Communication: Rapid Prototyping of Paper-Based Microfluidics with Wax for Low-Cost, Portable Bioassay," Electrophoresis, 2009, 30, pp. 1497-1500.

Mabey, et al., "Diagnostics for the Developing World," Nature Reviews / Microbiology, vol. 2, Mar. 2004, pp. 231-240.

Martinez, et al., "Diagnostics for the Developing World: Microfluidic Paper-Based Analytical Devices," Analytical Chemistry, vol. 82, No. 1, Jan. 2010, pp. 3-10.

Martinez, et al., "FLASH: A Rapid Method for Prototyping Paper-Based Microfluidic Devices," Lab Chip, 2008, 8, pp. 2146-2150, A Journal of the Royal Society of Chemistry.

Martinez, et al., "Paper: Programmable Diagnostic Devices Made from Paper and Tape," Lab Chip, Jul. 2010, 6 pages.

Martinez, et al., "Patterned Paper as a Platform for Inexpensive, Low-Volume, Portable Bioassays**," Agnew. Chem. Int. Ed., 2007, 46, pp. 1318-1320.

Martinez, et al., "Simple Telemedicine for Developing Regions: Camera Phones and Paper-Based Microfluidic Devices for Real-Time, Off-Site Diagnosis," Analytical Chemistry, vol. 80, No. 10, May 2008, pp. 3699-3707.

Martinez, et al., "Three-Dimensional Microfluidic Devices Fabricated in Layered Paper and Tape," PNAS, vol. 105, No. 50, Dec. 2008, pp. 19606-19611.

Matsumoto, et al., "Three-Dimensional Cell and Tissue Patterning in a Strained Fibrin Gel System," PLoS One, Nov. 2007, Issue No. 11, 6 pages.

Nelson, et al., "Three-Dimensional Lithographically Defined Organotypic Tissue Arrays for Quantitative Analysis of Morphogenesis and Neoplastic Progression," Nature Protocols, vol. 3, No. 4, 2008, pp. 674-678.

Nie et al., "Paper: Integration of Paper-based Microfluidic Devices with Commercial Electrochemical Readers," Lab Chip, Oct. 2010, 7 pages.

Peele, et al., "Semi-Automated vs. Visual Reading of Urinalysis Dipsticks," Clin. Chem, 1977, 23, pp. 2242-2246.

Pugia, et al., "High-Sensitivity Dye Binding Assay for Albumin in Urine," J. Clin. Lab. Anal. 1999, 13, pp. 180-187.

Reches, et al., "Thread as a Matrix for Biomedical Assays," Applied Materials & Interfaces, vol. xxx, No. xx, 000, xxxx, pp. A-G, 2010.

Shaw, et al., "Negative Photoresists for Optical Lithography," IBM Journal of Research and Development, vol. 41, No. 1/2, Jan./Mar. 1997, pp. 81-94, 15 pages.

Shimizu, et al., "Biofilm Formation on Hydrophilic Intraocular Lens Material," Current Eye Research, 31, 2006, pp. 989-997.

Sia, et al., "Microfluidic Devices Fabricated in Poly(dimethylsiloxane) for Biological Studies," Electrophoresis, 2003, 24, pp. 3563-3576.

Siegel, et al., "Foldable Printed Circuit Boards on Paper Substrates," Advanced Functional Materials, 2010, 20, pp. 28-35.

Smith, S.K., "Angiogenesis, Vascular Endothelial Growth Factor and the Endometrium," Hum. Reprod. Update 1998, 4, pp. 509-519.

Tang, et al., "Molding of Three-Dimensional Microstructures of Geis," J. Am. Chem. Soc., 2003, 125, pp. 12988-12989.

Urbich, et al., "Endothelial Progenitor Cells: Characterization and Role in Vascular Biology," Circulation Research, DOI: 10.1161/01.RES.0000137877.89448.78, Aug. 2004, pp. 343-353.

von Lode, P., "Point-of-care Immunotesting: Approaching the Analytical Performance of Central Laboratory Methods," Clinical Biochemistry, 38, 2005, pp. 591-606.

Washburn, E. W., "The Dynamics of Capillary Flow," The Physical Review, vol. XVII, No. 3, Second Series, Mar. 1921, pp. 273-283.

Winkleman, et al., "Patterning micron-sized dfeatures in a crosslinked poly (acrylic acid) film by a wet etching process," The Royal Society of Chemistry, 2007, pp. 108-116.

Xerox Corporation, "Material Safety Data Sheet for Xerox Phaser 6250 Color Laser Toner," 2003, pp. E-1-E-5, retrieved from http://www.office.xerox.com/userdoc/P6250/6250_Web/pdfs/msds.pdf.

Zhi, et al., "Multianalyte Immunoassay with Self-Assembled Addressable Microparticle Array on a Chip," Analytical Biochemistry, vol. 318, No. 2, Jul. 2003, pp. 236-243.

Zhu, et al., "Research Article: Proposal to Create Subspecies of *Rickettsia conorii* Based on Multi-Locus Sequence Typing and an Emended Description of *Rickettsia conorii*," BMC Microbiology, 2005, 5:11, 11 pages.

Muller et al., "Automatic Paper Chromatography," Analytical Chemistry, vol. 21, No. 9, Sep. 1949, pp. 1123-1125.

\* cited by examiner

THREE-DIMENSIONAL MICROFLUIDIC DEVICES

RELATED APPLICATIONS

This application is a national stage of International (PCT) Patent Application Serial No. PCT/US2009/038693, filed Mar. 27, 2009, and published under PCT Article 21(2) in English, which claims priority to U.S. Provisional Patent Application No. 61/072,049, filed Mar. 27, 2008, which is hereby incorporated by reference in its entirety. This application is related to PCT/US07/081848, which is hereby incorporated by reference in its entirety.

BACKGROUND

The disclosed subject matter relates generally to three-dimensional microfluidic devices.

In recent years, microfluidic systems have attracted increasing interests due to their diverse and widespread potential applications. For example, using very small volumes of samples, microfluidic systems could carry out complicated biochemical reactions to acquire important chemical and biological information. Among other advantages, microfluidic systems reduce the required amount of samples and reagents, shorten the response time of reactions, and decrease the amount of biohazard waste for disposal.

First developed in the early 1990s, microfluidic devices were initially fabricated in silicon and glass using photolithography and etching techniques adapted from the microelectronics industry. Current microfluidic devices are constructed from plastic, silicone or other polymeric materials, e.g. polydimethylsiloxane (PDMS). Such devices are generally expensive, inflexible, and difficult to construct.

Lateral-flow fluidic devices are two dimensional (2-D) and are used for applications where fluids need to be transported in a single plane, in series or in parallel. However, fluids in adjacent channels in a 2-D device cannot cross one another without intersecting. This topological constraint ultimately limits the design and applications of 2-D fluidic devices. Thus, there remains a need for three dimensional microfluidic devices that are inexpensive, flexible, and easy to construct.

SUMMARY OF THE INVENTION

In one aspect of the invention, a three-dimensional microfluidic device is described. The three-dimensional microfluidic device includes a plurality of patterned porous, hydrophilic layers including at least a first and second patterned porous, hydrophilic layers. The patterned porous, hydrophilic layer includes a fluid-impermeable barrier which substantially permeates the thickness of the patterned porous, hydrophilic layer and defines a boundary of one or more hydrophilic regions within each patterned porous, hydrophilic layer. The three-dimensional microfluidic device also includes a fluid-impermeable layer disposed between the first and second patterned porous, hydrophilic layers and every two adjacent patterned porous, hydrophilic layers. The fluid-impermeable layer includes one or more openings. The three-dimensional microfluidic device also includes a porous hydrophilic medium disposed in the opening of the fluid-impermeable layer disposed between the first and second patterned porous, hydrophilic layers. The hydrophilic medium contacts at least one of the hydrophilic regions within each of the first and second patterned porous, hydrophilic layers.

In one embodiment, the porous, hydrophilic medium includes paper. In another embodiment, the porous, hydrophilic medium includes chromatography paper. In yet another embodiment, the porous, hydrophilic medium includes paper and the paper is infused with components selected from the group including chemical or biological reagents, indicators, binders, fluid flow-impeding agents, fluid flow-promoting agents, or a combination thereof. In yet another embodiment, the porous, hydrophilic layer includes paper. In yet another embodiment, the porous, hydrophilic layer includes chromatography paper. In yet another embodiment, the barrier includes polymerized photoresist. In yet another embodiment, the barrier includes polymerized photoresist and the photoresist includes SU-8 photoresist. In yet another embodiment, the fluid-impermeable layer includes a plastic sheet. In yet another embodiment, the fluid-impermeable layer includes a plastic sheet and the plastic sheet includes adhesive tape. In yet another embodiment, the fluid-impermeable layer includes a plastic sheet, the plastic sheet includes adhesive tape, and the adhesive tape includes double-sided adhesive tape.

In yet another embodiment, the hydrophilic regions include a first hydrophilic region including a reservoir for depositing a first fluid; a second hydrophilic region including a distributing region for receiving the first fluid from the reservoir and distributing the first fluid; and an array of hydrophilic regions for receiving the first fluid from the distributing region. In yet another embodiment, each hydrophilic region of the array further includes an assaying reagent for assaying the first fluid. In yet another embodiment, the assay reagent is a protein assay reagent, a glucose assay reagent, a sodium acetoacetate assay reagent, a sodium nitrite assay reagent, or a combination thereof.

In another aspect, a three-dimensional microfluidic device is described. The three-dimensional microfluidic device includes a plurality of patterned porous, hydrophilic layers. Each patterned porous, hydrophilic layer includes a fluid-impermeable barrier which substantially permeates the thickness of the patterned porous, hydrophilic layer and defines a boundary of one or more hydrophilic regions within each patterned porous, hydrophilic layer. The three-dimensional microfluidic device also includes a fluid-impermeable layer disposed between every two adjacent patterned porous, hydrophilic layers and the fluid-impermeable layer includes one or more openings. The three-dimensional microfluidic device also includes a material plug filling one or more of the openings to provide local temperature control, to assay fluid samples, to filter microfluidic sample, or to modulate microfluidic flow. The material plug is in direct contact with at least of portion of one of the hydrophilic regions within each adjacent patterned porous, hydrophilic layer.

In one embodiment, the material plug includes an assaying reagent for assaying fluidic samples. In another embodiment, the material plug includes an assaying reagent for assaying fluidic samples and the assay reagent includes a protein assay reagent, a glucose assay reagent, a sodium acetoacetate assay reagent, a sodium nitrite assay reagent, or a combination thereof. In yet another embodiment, the material plug includes a seed. In yet another embodiment, the seed includes soybean seeds, hulls, and powdered soybean, or any other seeds that provide peroxidase to be used as an assay reagent. In yet another embodiment, the material plug includes a filter for filtering solids or blood cells. In yet another embodiment, the filter includes filter papers, any other filtration medium for removing solid contaminants, dextran, or any other materials that can remove red blood cells from a blood sample. In yet another embodiment, the material plug includes a salt which either absorb heat or give off heat when in contact with fluid to provide local temperature control. In yet another embodiment, the salt includes ammonium nitrate or magnesium sulfate. In yet another embodiment, the material plug includes a gel which swells when in contact with fluid to allow microfluidic communication. In yet another embodiment, the material plug includes a gel which swells when in contact with fluid to allow microfluidic communication and the gel includes agarose, methylcellulose, or hylaronan. In yet another embodiment, the material plug includes a magnetic material which is capable of movement under the influence of a magnetic field to allow microfluidic communication. In yet another embodiment, the magnetic material includes iron oxide. In yet another embodiment, the material plug includes a fluid-mixable material or a mixture of a fluid-mixable material and a fluid-unmixable material; and the fluid-mixable material dissolves when in contact with fluid to allow microfluidic communication and no microfluidic communication is allowed once the fluid-mixable material has been dissolved and flowed away. In yet another embodiment, the fluid-mixable material includes sugar. In yet another embodiment, the sugar includes sucrose. In yet another embodiment, the fluid-unmixable material includes a hydrophobic polymer. In yet another embodiment, the hydrophobic polymer includes polystyrene. In yet another embodiment, the porous, hydrophilic layer includes paper. In yet another embodiment, the porous, hydrophilic layer includes chromatography paper. In yet another embodiment, the barrier includes polymerized photoresist. In yet another embodiment, the photoresist includes SU-8 photoresist. In yet another embodiment, the fluid-impermeable layer includes a plastic sheet. In yet another embodiment, the plastic sheet includes adhesive tape. In yet another embodiment, the adhesive tape includes double-sided adhesive tape.

In yet another aspect, a three-dimensional microfluidic mixer is described. The three-dimensional microfluidic mixer includes a first patterned porous hydrophilic layer including a fluid-impermeable barrier which substantially permeates the thickness of the patterned porous, hydrophilic layer and defines boundaries of one or more hydrophilic regions. One of the hydrophilic regions within the first patterned porous hydrophilic layer includes a first fluid flowing channel and a second fluid flowing channel, and a combination zone. The first and second fluid flowing channels merge into the combination zone. The three-dimensional microfluidic mixer also includes a second patterned porous hydrophilic layer including a fluid-impermeable barrier which substantially permeates the thickness of the patterned porous, hydrophilic layer and defines boundaries of one or more hydrophilic regions. One of the hydrophilic regions within the second patterned porous hydrophilic layer includes a mixing channel. The three-dimensional microfluidic mixer also includes a fluid-impermeable layer disposed between the first and second patterned porous, hydrophilic layers and including an unfilled opening which is in alignment with the combination zone and at least portion of the mixing channel. The combination zone is capable of moving from a first spaced apart position into a second contact position. In the spaced apart position, the combination zone is not in fluidic contact with the mixing channel. In the contact position, the combination zone is in fluidic contact with the mixing channel.

In one embodiment, the first and second fluid flowing channels merge into the combination zone and define an interface between the first and second fluid flowing channels. In another embodiment, the mixing channel is perpendicular to the interface. In yet another embodiment, the mixing channel is more than 1 mm long. In yet another embodiment, the porous, hydrophilic layer includes paper. In yet another embodiment, the porous, hydrophilic layer includes chromatography paper. In yet another embodiment, the barrier includes polymerized photoresist. In yet another embodiment, the photoresist includes SU-8 photoresist. In yet another embodiment, the fluid-impermeable layer includes a plastic sheet. In yet another embodiment, the plastic sheet includes adhesive tape. In yet another embodiment, the adhesive tape includes double-sided adhesive tape.

In yet another aspect, a three-dimensional microfluidic flow control device is described. The three-dimensional microfluidic flow control device includes a plurality of porous, hydrophilic layers including a fluid-impermeable barrier which substantially permeates the thickness of the patterned porous, hydrophilic layer and defines boundaries of one or more hydrophilic regions. The plurality of porous, hydrophilic layers include a first patterned porous hydrophilic layer including a fluid-impermeable barrier which substantially permeates the thickness of the first patterned porous, hydrophilic layer and defines boundaries of one or more hydrophilic regions and of the hydrophilic regions within the first patterned porous hydrophilic layer includes a first flowing channel. The plurality of porous, hydrophilic layers also include a second patterned porous hydrophilic layer including a fluid-impermeable barrier which substantially permeates the thickness of the second patterned porous, hydrophilic layer and defines boundaries of one or more hydrophilic regions and one of the hydrophilic regions within the second patterned porous hydrophilic layer includes a second flowing channel. The three-dimensional microfluidic flow control device also includes a fluid-impermeable layer disposed between every two adjacent patterned porous, hydrophilic layers and the fluid-impermeable layer includes one or more openings. The fluid-impermeable layers includes a first fluid-impermeable layer disposed between the first and second patterned porous, hydrophilic layers and including an unfilled opening which at least is in partial alignment with the first and second flowing channels. At least portion of the first flowing channel is capable of moving from a first spaced apart position into a second contact position. In the spaced apart position, the first flowing channel is not in fluidic contact with the second flowing channel. In the contact position, the first flowing channel is in fluidic contact with the second flowing channel.

In one embodiment, the porous, hydrophilic layer includes paper. In another embodiment, the porous, hydrophilic layer includes chromatography paper. In yet another embodiment, the barrier includes polymerized photoresist. In yet another embodiment, the photoresist includes SU-8 photoresist. In yet another embodiment, the fluid-impermeable layer includes a plastic sheet. In yet another embodiment, the plastic sheet includes adhesive tape. In yet another embodiment, the adhesive tape includes double-sided adhesive tape. In yet another embodiment, the three-dimensional microfluidic flow control device of further includes a hydrophobic plug disposed in one of the openings within one of the fluid-impermeable layers and the hydrophobic plug includes a low-melting-point hydrophobic material capable of melting and flowing at a pre-selected temperature. One of the patterned porous, hydrophilic layers is below the fluid-impermeable layer containing the hydrophobic plug and includes one of the hydrophilic regions in at least partial alignment with the hydrophobic plug. At the pre-selected temperature the hydrophobic material melts and flows into the hydrophilic region in at least partial alignment with the hydrophobic plug to substantially obstruct the hydrophilic region and prohibits microfluidic flow within the hydrophilic region. In another embodiment, the hydrophobic plug includes a porous hydrophilic medium permeated by the low-melting-point hydrophobic material. In yet another embodiment, the porous hydrophilic medium includes paper. In yet another embodiment, the low-melting-point hydrophobic material includes low-melting-point wax. In yet another embodiment, the wax includes candle wax, cheese wax, packaging wax, paraffin wax, bayberry wax, or other waxes. In yet another embodiment, the wax is bayberry wax. In yet another embodiment, the low-melting-point hydrophobic material has a melting point of less than 200° C., less than 100° C., less than 50° C., or between 45° C. and 50° C.

In yet another aspect, a three-dimensional microfluidic flow control device is described. The three-dimensional microfluidic flow control device includes a first patterned porous hydrophilic layer and a second patterned porous hydrophilic layer, each including a fluid-impermeable barrier which substantially permeates the thickness of the first or second patterned porous, hydrophilic layer and defines boundaries of one or more hydrophilic regions within the first or second patterned porous, hydrophilic layer. The three-dimensional microfluidic flow control device also includes a fluid-impermeable layer disposed between the first and second patterned porous, hydrophilic layers including one or more openings and a hydrophobic plug disposed in the fluid-impermeable layer. The hydrophobic plug includes a low-melting-point hydrophobic material capable of melting and flowing at a pre-selected temperature. The second patterned porous hydrophilic layer is below the fluid-impermeable layer containing the hydrophobic plug and includes one of the hydrophilic regions in at least partial alignment with the hydrophobic plug. At the pre-selected temperature the hydrophobic material melts and flows into the hydrophilic region in at least partial alignment with the hydrophobic plug to substantially obstruct the hydrophilic region and prohibits microfluidic flow within the hydrophilic region.

In one embodiment, the hydrophobic plug includes a porous hydrophilic medium permeated by the low-melting-point hydrophobic material. In another embodiment, the porous hydrophilic medium includes paper. In yet another embodiment, the low-melting-point hydrophobic material includes low-melting-point wax. In yet another embodiment, the wax includes candle wax, cheese wax, packaging wax, paraffin wax, bayberry wax, or other waxes. In yet another embodiment, the wax includes bayberry wax. In yet another embodiment, the low-melting-point hydrophobic material has a melting point of less than 200° C., less than 100° C., less than 50° C., or between 45° C. and 50° C. In yet another embodiment, the porous, hydrophilic layer includes paper. In yet another embodiment, the porous, hydrophilic layer includes chromatography paper. In yet another embodiment, the barrier includes polymerized photoresist. In yet another embodiment, the photoresist includes SU-8 photoresist. In yet another embodiment, the fluid-impermeable layer includes a plastic sheet. In yet another embodiment, the plastic sheet includes adhesive tape. In yet another embodiment, the adhesive tape includes double-sided adhesive tape.

As used herein, "aperture" and "opening" are used interchangeably. As used herein, "2-D" and "two-dimensional" are used interchangeably. As used herein, "3-D" and "three-dimensional" are used interchangeably.

BRIEF DESCRIPTION OF THE DRAWING

Preferred, non-limiting embodiments of the present invention will be described by way of examples with reference to the accompanying figures, in which.

DETAILED DESCRIPTION

Figure 1:
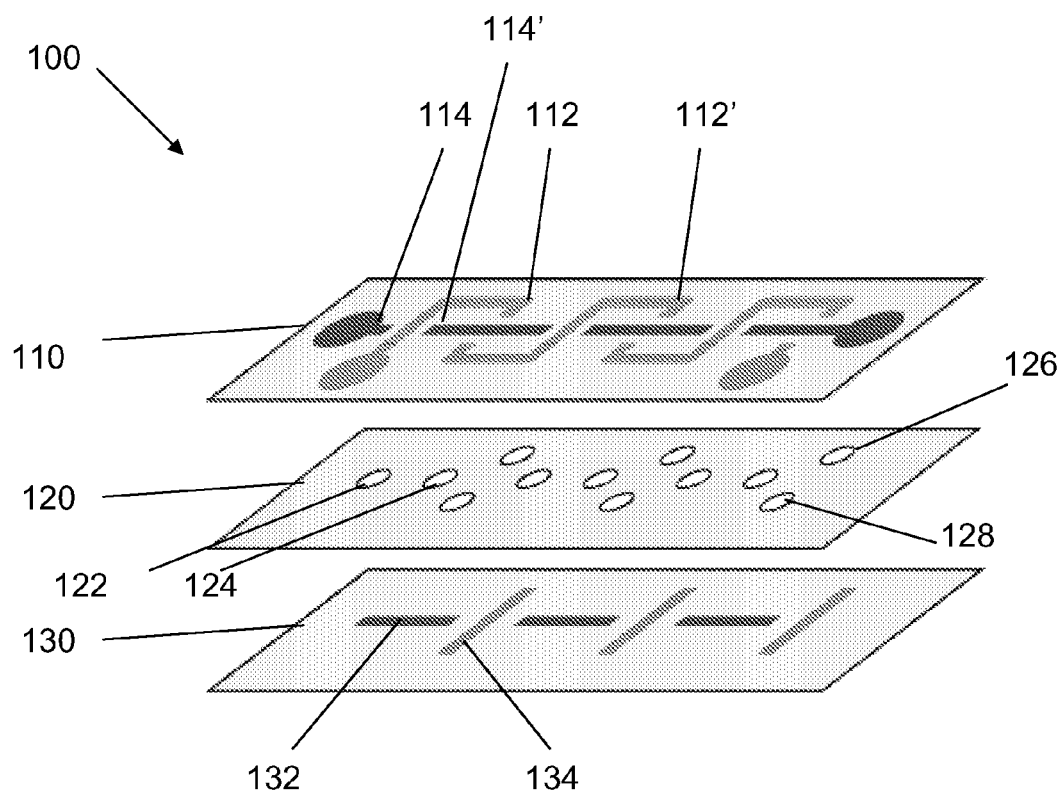
FIG. 1 is a schematic illustration of a three-dimensional microfluidic device fabricated by aligning and stacking alternating layers of patterned paper and double-sided tape.

An exemplary multilayer microfluidic device is described here with reference to FIG. 1 and demonstrates the principals of vertical and lateral flow. FIG. 1 schematically illustrates a perspective view of a three-dimensional microfluidic device 100, which includes two layers of patterned paper 110 and 130, and one separating layer of barrier material 120, e.g., double sided tape, with apertures such as 122, 124, 126, and 128. The three layers 110, 120, 130 are aligned and bonded to each other. Patterned paper layer 110 contains non-intersecting channels 112 and 114. Separating layer 120 includes a set of apertures 122 and 124 that are located to direct fluid from channel 114 in the upper patterned paper 110 to channel 132 in the lower patterned paper 130 and then back up to channel 114' in patterned paper 110. Separating layer 120 also includes a set of apertures 126 and 128 that are located to direct fluid from channel 112 to channel 134 in the lower patterned paper 130 and then back up to channel 112' in patterned paper 110, respectively. The device is one example of multilayer microfluidic channel that allows the separate channels, through which the dyes are flowing, to cross each other without any mixing taking place between the two fluids.

The microfluidic device relies on apertures within the separating layer to direct vertical microfluidic flow. The applicants have discovered that vertical flow (or flow through) can be significantly improved by filling the opening within the separating layer with a porous, hydrophilic material that bridges the gap between the adjacent hydrophilic layers. As a result, the two microfluidic regions within two adjacent patterned porous hydrophilic layers that partially overlap with the opening will be in direct contact with the hydrophilic material in the opening, thus allowing optimized microfluidic flow by capillarity. In one or more embodiments, the porous, hydrophilic material substantially fills the void within the separating layer created by the aperture. In one or more embodiments, the porous, hydrophilic material substantially matches the shape of the opening. The porous, hydrophilic material filling the opening can be, for example, porous paper pads or "dots" that have a thickness similar to the thickness of the separating layer. The paper can be cut into shape to match the dimensions of the void space created by the aperture in the separating layer.

In one aspect, three dimensional (3-D) microfluidic devices are described. In one embodiment, three-dimensional microfluidic devices made out of layers of fluid impermeable separating layers and patterned porous hydrophilic layers are described with reference to FIG. 2. The microfluidic devices includes layer(s) of paper, which have been patterned into hydrophilic regions or channels separated by hydrophobic barrier walls, and a fluid impermeable layer, containing apertures or openings filled with a porous, hydrophilic material, e.g. a paper plug, to allow fluids to efficiently move vertically from the hydrophilic regions of one layer of paper into another. The hydrophilic regions or channels in the layers of paper wick fluids in the horizontal plane, while the hydrophobic polymer patterned into the paper dictates where the fluids move within the channels, thus defining the directions of microfluidic lateral flow within the patterned paper. The fluid-impermeable layer is disposed between two adjacent layers of paper and separate the channels within the two adjacent layers of paper from one another. The apertures of the fluid-impermeable separating layers are filled with pieces of paper cut to substantially match the shape of the apertures. The apertures and the pieces of paper within are in alignment with at least a portion of a hydrophilic region within each of the two adjacent patterned porous hydrophilic layers. The paper plug in the openings are thus in contact with at least a portion of a hydrophilic region within each of the two adjacent porous paper layers to improve capillary action and allow fluids to efficiently move in the vertical plane (between adjacent layers of patterned hydrophilic paper) from channels in one layer of paper to channels in an adjacent layer of paper, through the pieces of paper within the opening. Because the layers of paper and tape are thin (~100-200 µm per layer), it is possible to stack several layers of paper and tape, without significantly changing the size of the device. Each layer of paper and tape can also be used to serve a unique function within a device (e.g., storing reagents, assaying fluids, filtering samples, distributing fluids, mixing fluids, and controlling fluidic flow).

Porous, hydrophilic layers include any hydrophilic substrate that wicks fluids by capillary action. In one or more embodiments, the porous, hydrophilic layer is paper. Non-limiting examples of porous, hydrophilic layers include chromatographic paper, filter paper, nitrocellulose and cellulose acetate, cellulosic paper, filter paper, paper towels, toilet paper, tissue paper, notebook paper, KimWipes, VWR Light-Duty Tissue Wipers, Technicloth Wipers, newspaper, any other paper that does not include binders, cloth, and porous polymer film. In general, any paper that is compatible with the selected patterning method may be used. In certain embodiments, porous, hydrophilic layers include Whatman chromatography paper No. 1.

Figure 2:
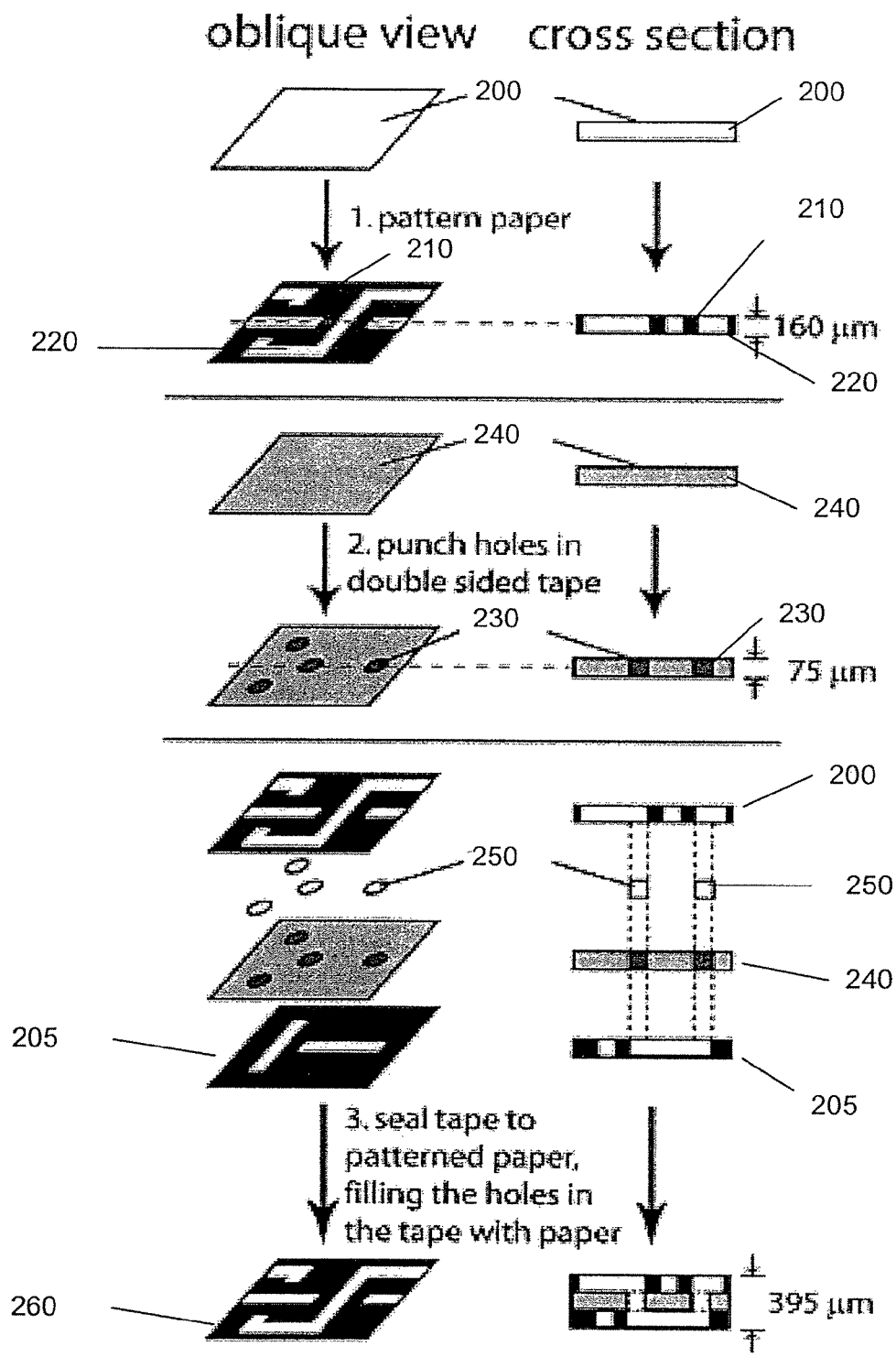
FIG. 2 is a schematic illustration of a three-dimensional microfluidic device fabricated by aligning and stacking alternating layers of patterned paper and double-sided tape with holes filled with pieces of paper.

In one or more embodiments, the hydrophilic layer is patterned following the procedures described in FIG. 2. In certain embodiments, the hydrophilic paper is soaked in photoresist, and photolithography is used to pattern the photoresist to form the barriers following the procedures described in PCT/US07/081848. Other hydrophilic material such as nitrocellulose and cellulose acetate are commonly used and well-known membranes for their use in fluid diagnostics, but are not compatible with solvents typically used in photolithography. Other methods, such as screening, stamping or printing, can be more suitable for patterning such materials. In addition, the hydrophilic layer and the hydrophobic barrier regions could be prepared using materials that are compatible with the testing conditions, e.g., temperature, pH, and/or ionic strength.

The photoresist used for patterning porous, hydrophilic material include SU-8 photoresist, SC photoresist (Fuji Film), poly(methylmethacrylate), nearly all acrylates, polystyrene, polyethylene, polyvinylchloride, and any photopolymerizable monomer that forms a hydrophobic polymer.

The fluid-impermeable layer is typically a sheet that is not soluble in the fluid of the microfluidic device and that provides the desired level of device stability and flexibility. In one or more embodiments, the fluid-impermeable layer is a plastic sheet. In certain embodiments, the fluid-impermeable layer is an adhesive sheet or tape. Non-limiting examples of fluid-impermeable layer includes Scotch® double-sided carpet tape, water-impermeable barriers include 3M Double Sided Tape, Tapeworks double sided tape, CR Laurence black double sided tape, 3M Scotch Foam Mounting double-sided tape, 3M Scotch double-sided tape (clear), QuickSeam splice tape, double sided seam tape, 3M exterior weather-resistant double-sided tape, CR Laurence CRL clear double-sided PVC tape, Pure Style Girlfriends Stay-Put Double Sided Fashion Tape, Duck Duck Double-sided Duct Tape, and Electriduct Double-Sided Tape. In certain specific embodiments, double-sided tape is used as the fluid-impermeable layer. Double-sided tape adheres to two adjacent layers of patterned paper and can bind to other components of the microfluidic device. It is impermeable to water, and isolates fluid streams separated by less than 200 µm. In addition, it is also sufficiently thin to allow adjacent layers of paper to contact through holes punched in the tape when compressed. It can easily separate from the paper to which it adheres and thus allow disassembly of stacked devices and it is inexpensive and widely available.

As an alternative to double-sided tape, a heat-activated adhesive can be used to seal the fluid-carrying layers together. Indeed, any fluid-impermeable material that can be shaped and adhered to the pattern hydrophilic layers can be used. In addition, it is also possible to use the same material that is used to pattern the paper layers to join the layers of paper together. In one or more embodiments, a layer of photoresist is disposed between two adjacent patterned porous, hydrophilic layers.

The porous, hydrophilic material filling the aperture or opening could be the same material as the porous, hydrophilic layers or different material. Non-limiting examples of porous, hydrophilic material include chromatographic paper, filter paper, nitrocellulose and cellulose acetate, cellulosic paper, filter paper, paper towels, toilet paper, tissue paper, notebook paper, KimWipes, VWR Light-Duty Tissue Wipers, Technicloth Wipers, newspaper, and any paper that does not include binders.

In one or more embodiments, the patterned porous hydrophilic layer is Whatman chromatography paper No. 1 (which wicks water well, and is pure cellulose) patterned using SU-8 2010 photoresist, the fluid-impermeable layer is Scotch® double-sided carpet tape, and the porous, hydrophilic material filling the aperture of opening in the fluid-impermeable layer is Whatman chromatography paper No. 1.

The advantages of the microfluidic devices described herein include the following: the devices are inexpensive to produce; they are easy to assemble, and do not require specialized equipment; the inner layers are protected from the environment, thus limiting evaporation; the inner layers can be used to store reagents for assays that are sensitive to light; they emphasize short vertical zones corresponding to the thickness of the various types of paper selected for each function; and complex channels can easily be fabricated and easily disassembled.

In one embodiment, a microfluidic device is described with reference to FIG. 2 and demonstrates the principals of vertical and lateral flow. As shown in FIG. 2, the microfluidic device is assembled by aligning and stacking alternating layers of patterned paper and double-sided tape used as the fluid-impermeable layer. In some embodiments, microfluidic devices having small features (for example, features less than about 1 mm-wide channels) are assembled using automated assembly. In other embodiments, the alignment can be carried out by eye. The assembly is demonstrated in oblique view (on left) and in cross section view (on right). In step 1, paper 200 is patterned into microfluidic regions of hydrophilic paper 220 (white regions) and hydrophobic polymer 210 (black regions) using photolithography. A second hydrophilic paper 205 is then patterned for the lower layer of the device. In this embodiment, the hydrophobic polymer is SU-8 photoresist and the hydrophilic paper is Whatman chromatography paper No. 1. Paper can have a range of thickness; Whatman chromatography paper No. 1 has a thickness of about 160 µm. In step 2, holes 230 were punched within the layer of double-side tape 240 in the locations where contact points between adjacent layers of paper are desired. The separating layer can have a range of thicknesses, but is typically selected to minimize the bulk and volume of the device. In this embodiment, the tape has a thickness of about 75 µm. In step 3, the space within the holes 230 in the tape 240 is filled with a piece of paper 250 cut to match shape of the hole in the tape (2.5-mm wide). Without filling the space with paper, the fluids would not wick optimally across the small gap (~75 µm) from one layer of paper to another through the holes in the tape. The holes were filled with the same type of paper as the paper layers, such as Whatman chromatography paper No. 1, serves to eliminate the gap, and provides reliable contact between the two layers of patterned paper. Alternatively, the holes could be filled with pieces of any type of hydrophilic material. After the holes in the tape were filled, each side of the tape is attached to a layer of patterned paper to form a sandwich of paper-tape-paper 260 as shown in FIG. 2. The overall thickness of the device is quite thin, e.g., less than 0.4 mm.

Figure 3:
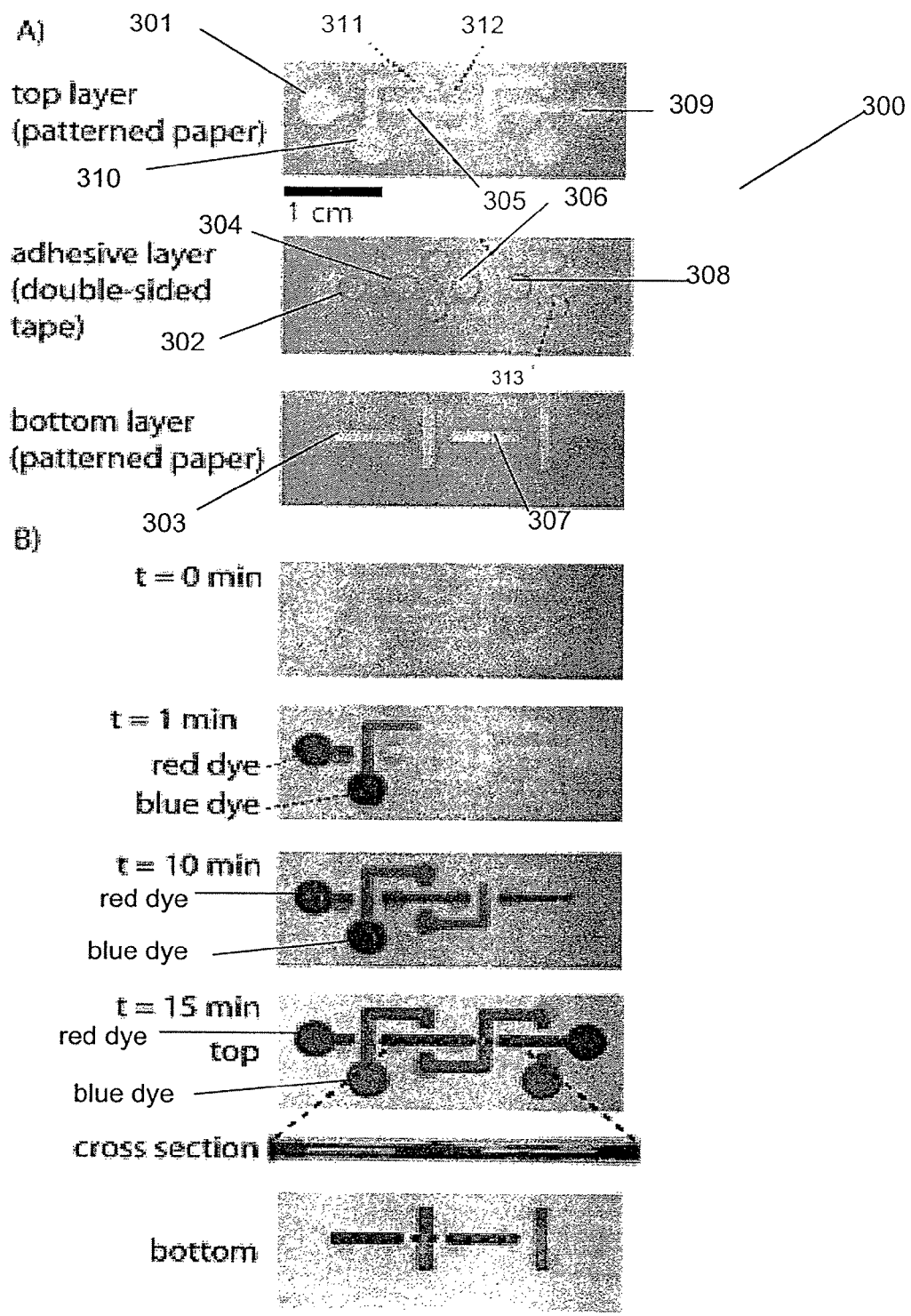
FIG. 3 is an exploded view of a three-dimensional microfluidic device which enables two aqueous fluids to cross without touching or mixing.

In another embodiment, a microfluidic device with two channels that cross each other four times without contacting one another is described with reference to FIG. 3B to demonstrates the principals of vertical and lateral flow. The device is shown in FIG. 3A and is constructed using similar principle as described in FIG. 2, including patterned paper layers containing hydrophilic regions such as 311 and photoresist 312 and tape layers including paper-filled holes such as 313. The microfluidic device 300 enables two aqueous fluids to cross without touching or mixing. As shown in FIG. 3B, red and blue aqueous dyes from two sample reservoirs 301 and 310, respectively, were wicked following a path with multiple crossings, without mixing. The fluids flow through the channels in approximately 15 minutes by moving laterally (left to right) a distance of 3 cm (for red dye) and 4.5 cm (for blue dye). As shown in FIG. 3A, the device is assembled from two layers of patterned paper (a top layer and a bottom layer) and one layer of double-sided tape. The paper includes Whatman chromatography paper No. 1 which is patterned into hydrophilic regions of exposed paper and hydrophobic regions of SU-8 photoresist using photolithography. As illustrated in FIG. 3, 1-mM allura red AC (red dye) and 1-mM erioglaucine (blue dye) were wicked into hydrophilic channels of paper. The middle layer is Scotch® double-sided carpet tape with 2.5-mm diameter holes in locations that match the patterns of the two pieces of paper. The holes are filled with paper discs, e.g., 302, 304, 306, and 308. As an example, the detailed microfluidic flow of the red dye is described. The red dye is deposited in hydrophilic region 301 in the top patterned paper which is in partial alignment with paper disc 302 in one of the holes in the double-sided tape layer. Red dye is then wicked from 301 through paper disc 302 vertically into the bottom patterned paper, specifically, hydrophilic region 303. The red dye is wicked laterally through channel 303 and then vertically through paper disc 304 to the hydrophilic region 305 in the top layer. The red dye is then wicked again into the bottom layer through paper disc 306 into hydrophilic region 307 in the bottom paper layer, before it is wicked back to the top layer through paper disc 308 into hydrophilic region 309. The blue dye is wicked through the microfluidic device between layers as well and the two dyes cross each other four times without contacting one another. FIG. 3B shows a time sequence of photographs of the device. The first image shows the device before the dyes are deposited (t=0) and successive images show the device at 1 minute, 10 minutes, and 15 minutes after the dyes are deposited. The sequence shows the progressive movement of aqueous red and blue dye within the device. The cross section image shows that the fluids move only between the two layers of paper in the areas where there is a hole in the tape separating the two layers of paper.

Fabrication in 3-D in paper has the advantage of very short path-lengths (i.e., 200-600 µm, depending on the thickness of the paper and the number of layers of paper used) between sample entry points and regions for assays. Short path-lengths lead to rapid distribution of sample and rates of fluid transport by capillarity that are much higher than 2-D, lateral flow paper-based devices, and operationally comparable to open microchannel devices.

The ability to stack layers of paper brings new capabilities to microfluidics: i) the ability to build complex, 3-D, multilayer systems by stacking sheets of patterned paper; ii) the ability to fabricate systems with zones of different functionality separated by short distances (a few microns) vertically, rather than much larger distances (mm) horizontally. The microfluidic devices can be used for running multiple assays, adding regents to the intervening layers of paper, controlled mixing of fluids, and programming fluid flow.

Distributing a Single Sample into an Array

Figure 4A:
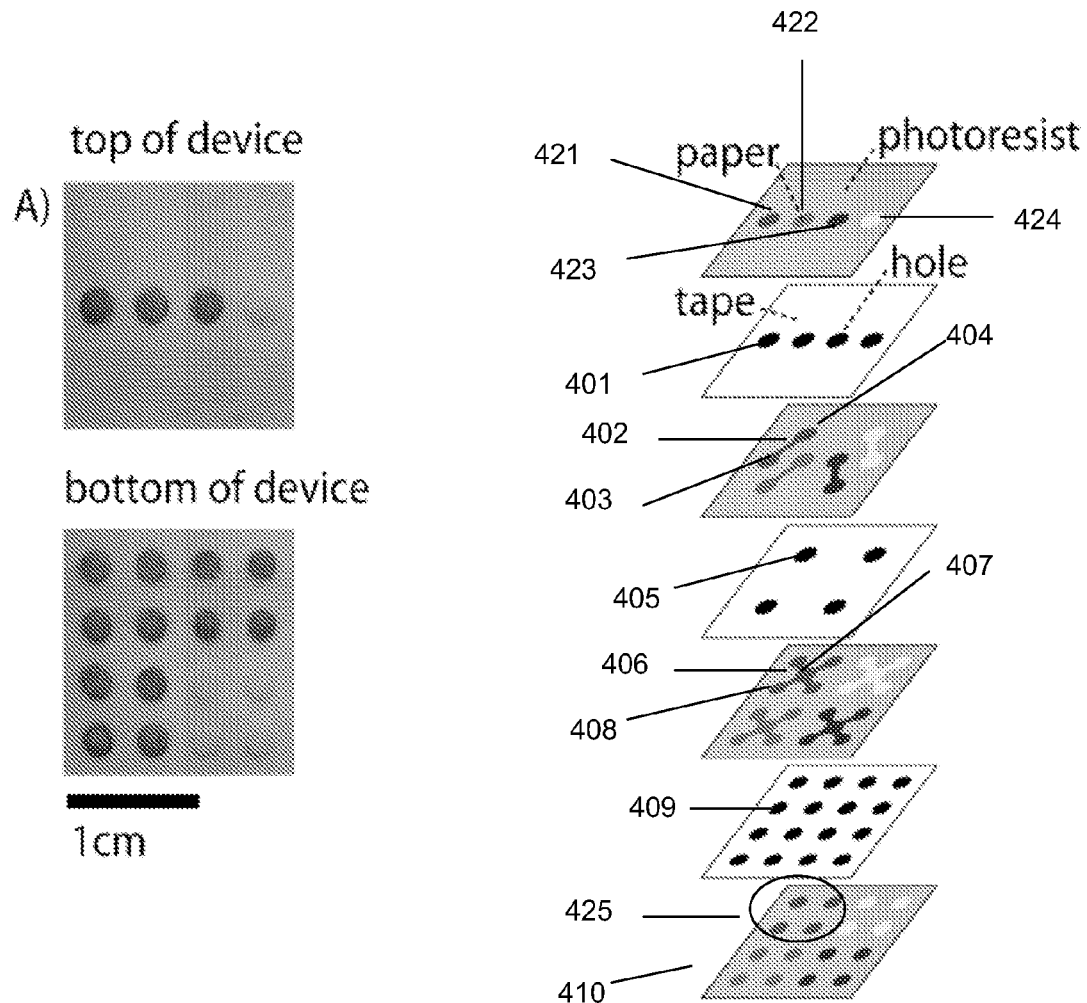
FIG. 4 illustrates four three-dimensional microfluidic devices which distribute samples into arrays.

In yet another embodiment, three-dimensional microfluidic devices for distributing samples from reservoirs into arrays of detection zones are described. The microfluidic devices include layers of patterned porous, hydrophilic layers, a fluid-impermeable layer with openings filled with a porous hydrophilic material disposed between every two adjacent patterned hydrophilic layers. In certain embodiments, the microfluidic devices further include a first hydrophilic region that serves as a fluid reservoir, a second hydrophilic region including a distributing region for distributing the first fluid, and an array of hydrophilic regions for receiving the first fluid from the distributing region. The reservoir and distributing regions can be on the same or different layers in the 3-D device. Four examples of 3-D devices that distribute samples in different ways are illustrated in FIGS. 4A, 4B, 4C, and 4D, respectively. Each of the devices is constructed using alternated layers of patterned paper with hydrophilic regions conducting lateral flow and fluid-impermeable layers with opening filled with paper disc conducting vertical flow. The microfluidic flow within the device follows the principle of lateral and vertical flow of the microfluidic device described above. The brown regions of the device are hydrophobic SU-8 photoresist, while the regions filled with dye are hydrophilic paper, as indicated in FIG. 4A. Each of the devices has the same input consisting of four wells on the top of the device, which are filled with blue, green, red and yellow aqueous dyes, respectively. As shown in FIG. 4, each device has different outputs, in which the device distributes the fluids added to the inlets into different patterns in a 4×4 array of test zones. The middle layers of the 3-D devices direct the samples into detection zones without mixing or cross-contamination between the samples.

Figure 4B:
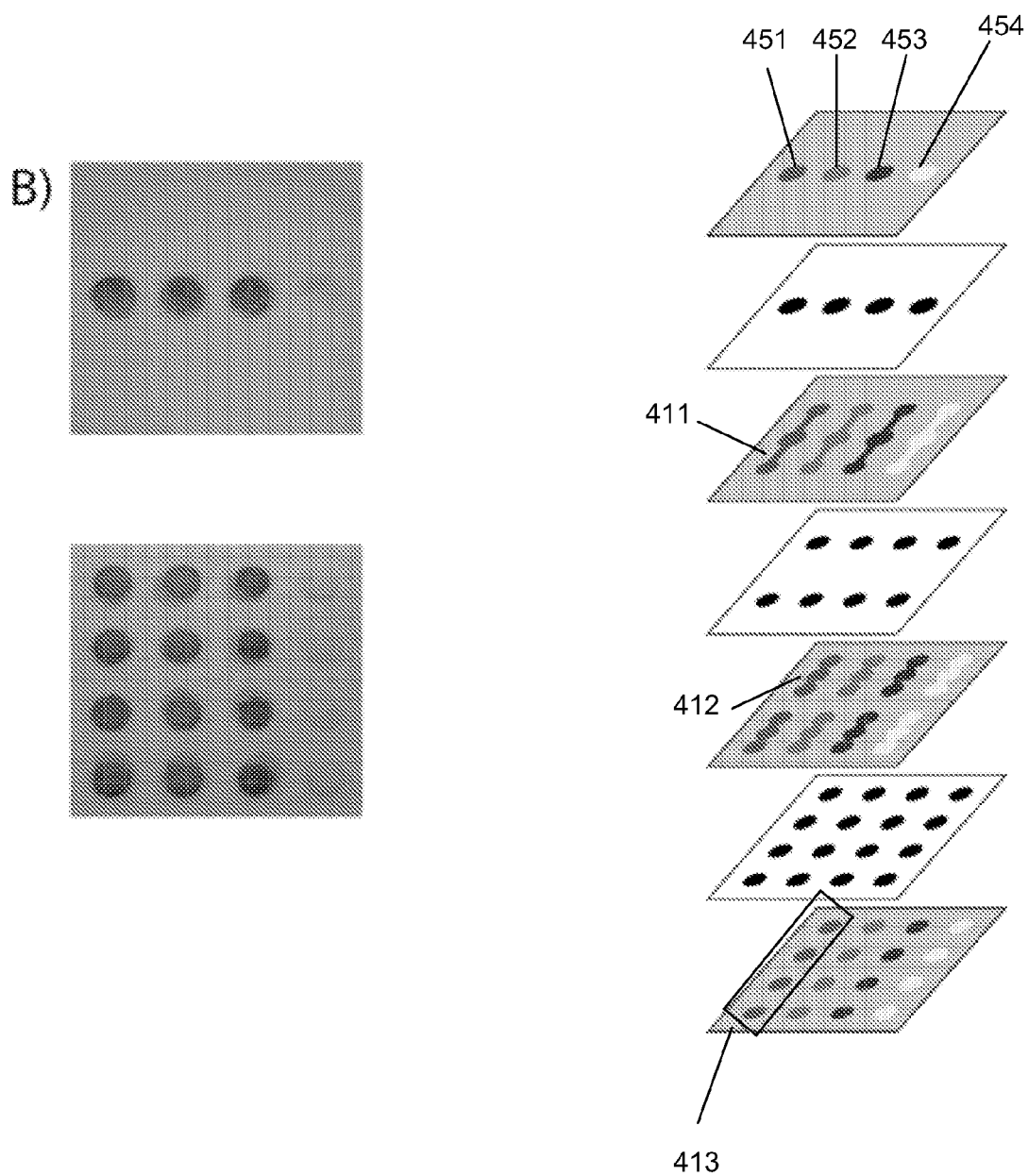

In the examples shown in FIGS. 4A and 4B, the detection zones are equidistantly spaced from the sample reservoir to ensure that the same volume of sample is collected in each detection zone. FIGS. 4A and 4B uses different combinations of linear and star burst hydrophilic distribution regions to accomplish different distribution patterns. In FIG. 4A, a blue sample is applied to the application reservoir 421 and is distributed through paper-disc-filled hole 401 to a channel distribution region 402 that distributes the blue sample from a first position 403 directly aligned with hole 401 to a second position 404 that is centrally located in a quadrant of the second paper layer. Liquid within 404 flows vertically through paper-disc-filled hole 405 to a central position 407 of a star-burst shaped hydrophilic distribution region 406. Liquid then flows laterally to termini, e.g., 408 and then vertically through paper-disc-filled hole 409 to the lower receiving layer 410. As shown in FIG. 4A, the receiving layer 410 has a quadrant 425, consisting of four hydrophilic regions filled with blue dyes (as indicated by the hydrophilic regions within the circle). The resultant array has quadrants of one color. Photographs of the top and bottom paper layers, indicating the starting and final positions of each dye is also shown. In FIG. 4B, a blue dye is deposited in reservoir 451 at the top of the device. The device in FIG. 4B uses a series of channel distribution regions 411 and 412 that produce an array of hydrophilic regions 413 (as indicated by the hydrophilic regions within the box) within the bottom paper layer containing the blue dye. Photographs of the top and bottom paper layers, indicating the starting and final positions of each dye are also shown.

Figure 4C:
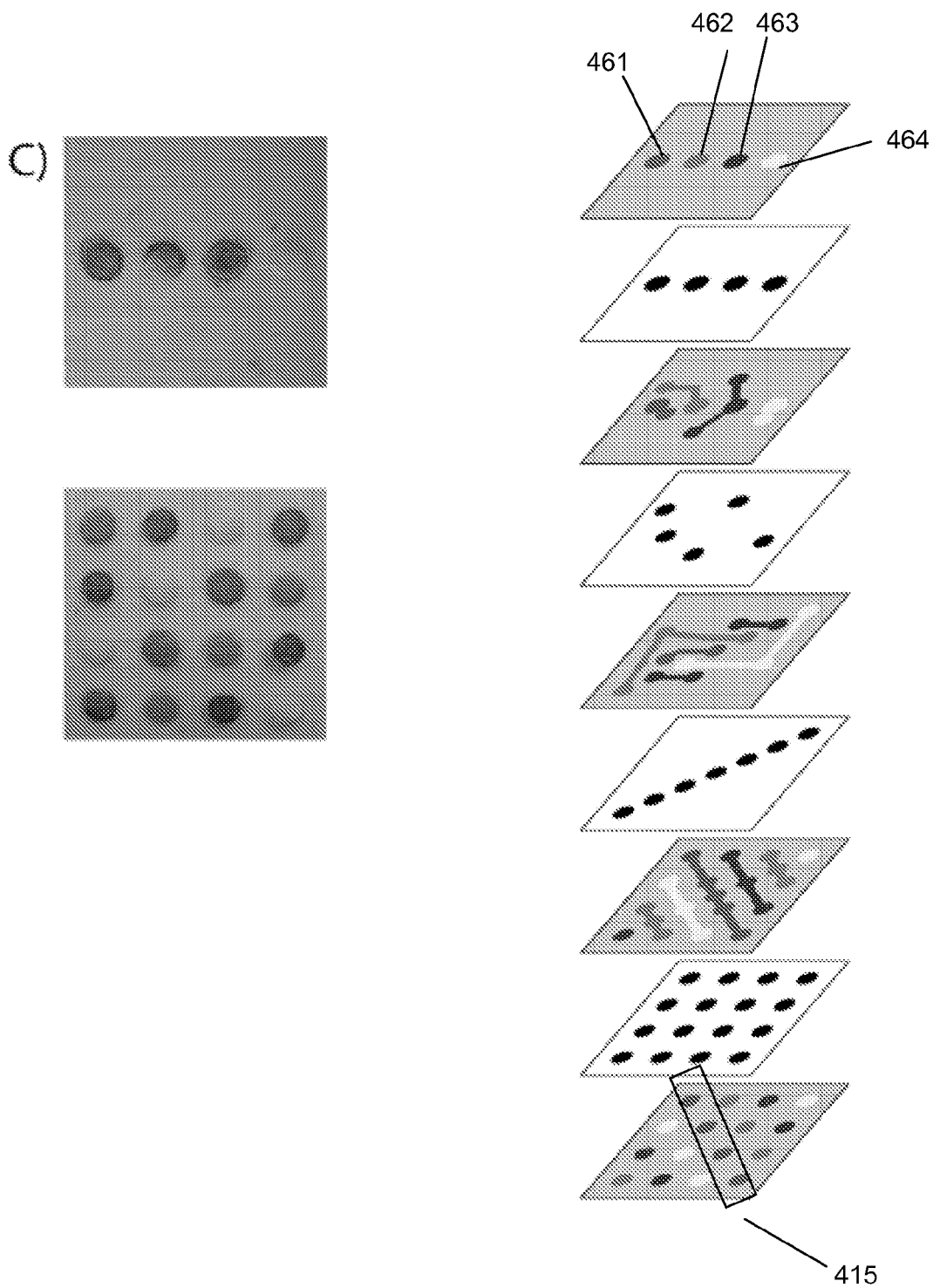

In the third example, shown in FIG. 4C, a blue dye is deposited into reservoir 461 and distributed into a final array contains color zones arranged in a diagonal 415 (as indicated by the hydrophilic regions within the box). The color zones fill at different times because they are not equidistant from sample reservoir. The devices shown in FIGS. 4A, 4B, and 4C distribute four samples from reservoirs at the top of the device into an array of 16 detection zones. FIGS. 4A, 4B, and 4C show 3 devices that wicked aqueous blue (1-mM erioglaucine, deposited at reservoirs 421, 451, and 461 in FIGS. 4A, 4B, and 4C, respectively), green (0.5-mM erioglaucine and 0.5-mM tartrazine, deposited at reservoirs 422, 452, and 462 in FIGS. 4A, 4B, and 4C, respectively), red (1-mM allura red AC, deposited at reservoirs 423, 453, and 463 in FIGS. 4A, 4B, and 4C, respectively) and yellow (1-mM tartrazine, deposited at reservoirs 424, 454, and 464 in FIGS. 4A, 4B, and 4C, respectively) dyes, and filled the 16 detection zones in 5 min.

Figure 4D:
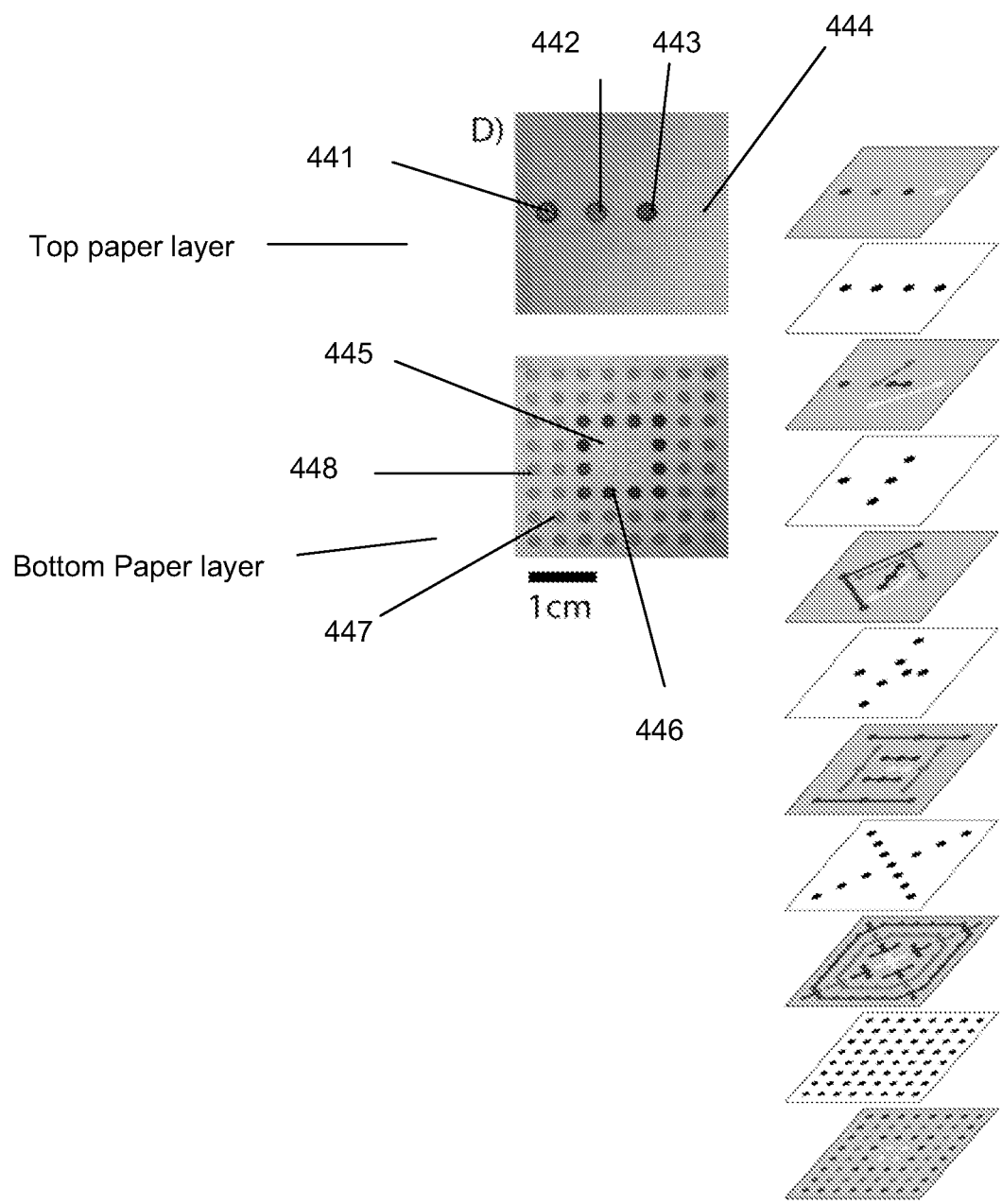

FIG. 4D illustrates the potential to use 3-D devices to distribute samples into large arrays of closely spaced test zones. In this example, four fluids 441, 442, 443, and 444 were deposited on the top of the microfluidic device as shown in FIG. 4D. The four fluids are distributed into an 8×8 array of test zones. This device also has four inlets, but it distributes samples into an array of 64 test zones. As shown by the photo of the bottom paper layer of the device, fluid 444 is distributed into 4 hydrophilic regions in the center of the bottom of the layer including hydrophilic region 445. The fluid 443 is distributed into 12 hydrophilic regions surrounding the 4 hydrophilic regions for fluid 444 on the bottom of the layer including hydrophilic region 446. The fluid 442 is distributed into 20 hydrophilic regions surrounding the 12 hydrophilic regions for fluid 443 on the bottom of the layer including hydrophilic region 447. The fluid 441 is distributed into 28 hydrophilic regions surrounding the 20 hydrophilic regions for fluid 442 on the bottom of the layer including hydrophilic region 448. The complexity of the output pattern determines the number of middle layers of paper and tape that are required in the device. In each of the four devices shown in FIGS. 4A-4D, the holes in the tape are filled with discs of Whatman chromatography paper No. 1.

Other patterns and more complex patterns could be obtained by incorporating additional layers of paper and tape into the device.

3-D Microfluidic Devices for Running Multiple Assays

In yet another embodiment, 3-D microfluidic devices to run multiple assays on multiple samples simultaneously are described. The microfluidic devices include layers of patterned porous, hydrophilic layers, a fluid-impermeable layer with openings filled with a porous hydrophilic material disposed between every two adjacent patterned hydrophilic layers. The microfluidic devices further include a first hydrophilic region serve as a fluid reservoir, a second hydrophilic region including a distributing region for distributing the first fluid, an array of hydrophilic regions for receiving the first fluid from the distributing region, and the array of hydrophilic regions for receiving the first fluid further include an assay agent for assaying the first fluid. In certain embodiments, the array of hydrophilic regions for receiving the first fluid are pre-spotted with various assay reagents for assaying the fluid.

Figure 5:
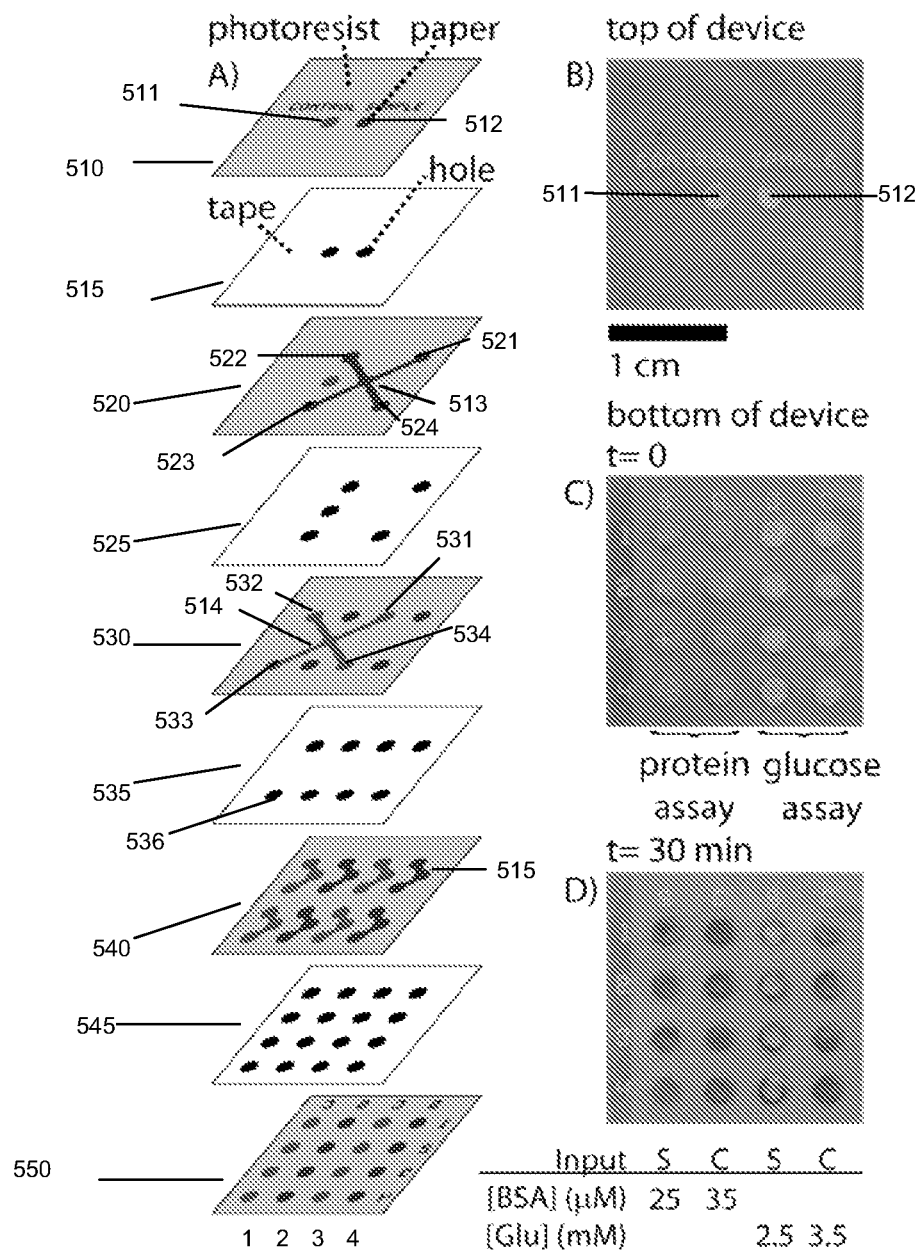
FIG. 5 illustrates a 16-well three-dimensional microfluidic device for running multiple assays.

In a specific embodiment, an example of a 16-well device used for this purpose is shown in FIG. 5. A microfluidic device for detecting protein and glucose in artificial urine is described. The microfluidic device is constructed using alternated layers of patterned paper 510, 520, 530, 540, and 550 with hydrophilic regions conducting lateral flow and fluid-impermeable layers 515, 525, 535, and 545 with opening filled with paper disc conducting vertical flow. FIG. 5A shows the device layers that distribute two samples from inlets 511 and 512 at the top of the device into an array of test zones at the bottom of the device following the principle of lateral and vertical flow of the microfluidic device described above. The samples are distributed so that they arrange in two sets of side-by-side columns. In a first distribution step, sample applied form reservoir 512 is distributed to four termini, 521, 522, 523, and 524 of a star burst shaped distribution region 513 on paper layer 520, while sample applied from reservoir 511 flows vertically in a single aliquot to paper layer 530 where the sample from 511 is distributed from into four termini, 531, 532, 533, and 534 of a star burst shaped distribution region 514 on paper layer 530. The fluids 511 and 512 flow vertically through the paper disc such as filling the holes within tape layer 535. The resulting eight channels of fluid flow (4 from reservoir 511 and 4 from reservoir 512) are further distributed on paper layer 540 using an "elbow" or bent distribution region 515 to produce a 4×4 array of distribution zones on paper layer 550. Columns 1 and 3 contain fluid applied from reservoir 511; and Columns 2 and 4 contain fluid applied from reservoir 512.

FIG. 5B shows the top of the assembled device with two labeled inlets for a sample 512 and a control 511. Reagents are spotted for each colorimetric assay in the test zones on the bottom layer of the device and before the assembly of the devices. FIG. 5C shows the bottom of the device with reagents for a protein assay and a glucose assay pre-spotted in the test zones. Samples that contained bovine serum albumin (BSA) and glucose are added to the top of the device. The presence of protein is indicated by a color change from yellow to blue. The presence of glucose is indicated by a color change from clear to brown.

The device shown in FIGS. 5B-5D runs two assays (with four replicates) on a single sample, and runs the same assays simultaneously on a control sample that contains known concentrations of the two analytes (glucose and protein in artificial urine) (FIG. 5B). The results of the assays appear side-by-side so that control and sample assays can be compared directly; this feature is particularly important when the samples are to be compared using telemedicine (camera phones and digital imaging software).

Figure 6:
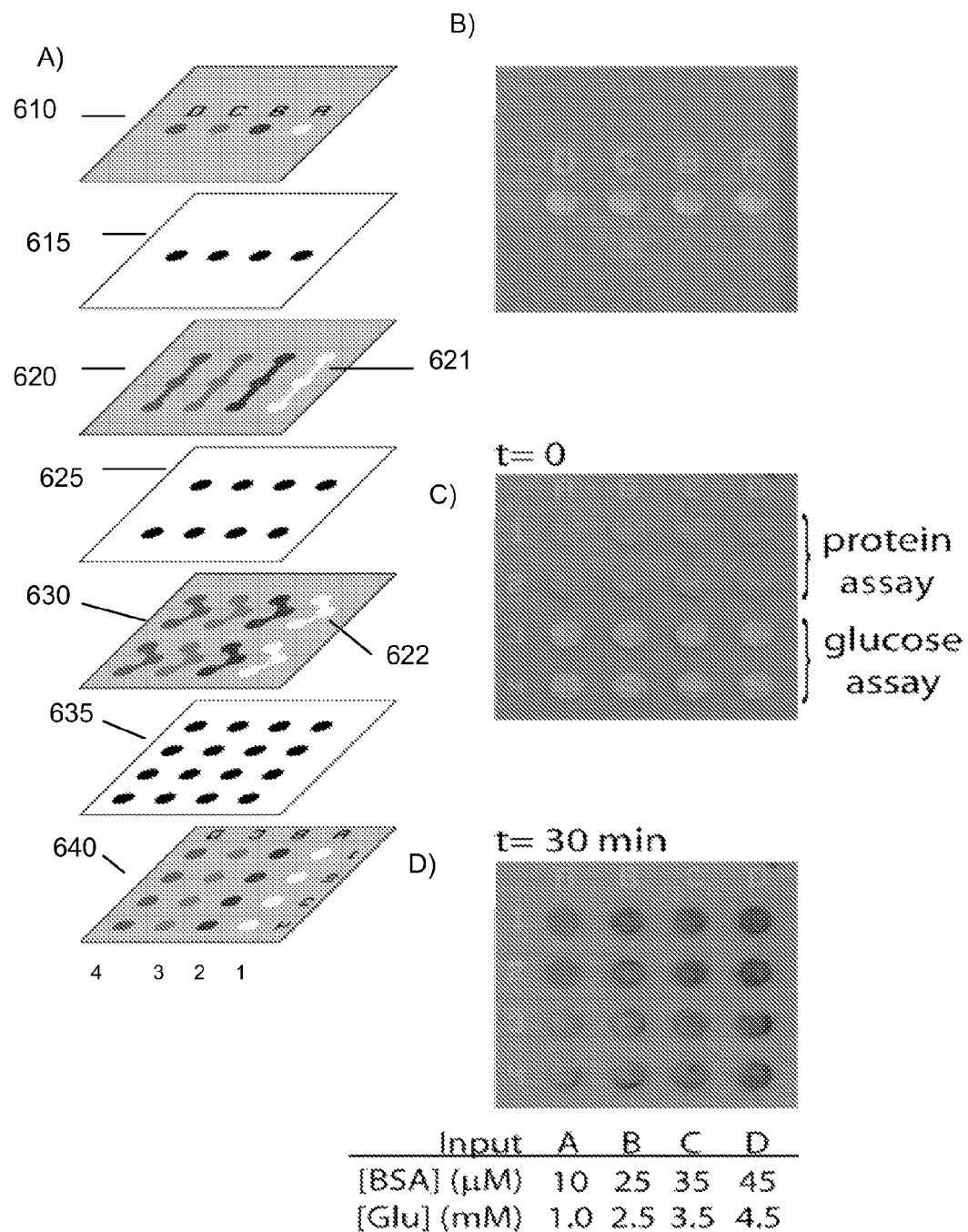
FIG. 6 illustrates another 16-well three-dimensional microfluidic device for running multiple assays.

Another 16-well device shown in FIGS. 6A-6D runs two assays in duplicate on four different samples, A, B, C, and D, simultaneously. The layout of the various layers of the microfluidic device is shown in FIG. 6A. Four reservoirs for fluids A, B, C, and D distribute four liquids through alternated paper layers 610, 620, 630, and 640 and fluid-impermeable layers 615, 625, and 635. Fluid A, for example, is distributed using distribution region 621 on paper layer 620 and bent distribution region 622 on paper layer 630, and eventually to 4 hydrophilic regions in column 1 of paper layer 640. The resultant test zones include 4 columns, each containing sample from one reservoir. Specifically, columns 1, 2, 3, and 4 of hydrophilic regions contain fluid A, B, C, and D, respectively. In this arrangement, one of the four samples can be a control sample for quantitative detection. The top of a device designed to test four different samples for two analytes is shown in FIG. 6B. The bottom of the device with reagents for a protein assay and a glucose assay pre-spotted in the test zones is shown in FIG. 6C, and is shown again in FIG. 6D at a time 30 minutes after adding 20 µL, of sample to the inlets.

Other non-limiting examples of assay reagents include other protein assay reagents, other glucose assay reagents, sodium acetoacetate assay reagents, sodium nitrite assay reagents, or a combination thereof. Other suitable assay reagents will be apparent to one skilled in the art.

Adding Regents to the Intervening Layers of Paper

In one aspect, a microfluidic device includes layers of patterned porous, hydrophilic layers, a fluid-impermeable layer with openings deposited between every two adjacent hydrophilic layers, and material plug filling at least one of the opening. In one or more embodiments, the material plug is a disc of paper containing reagents for assays and release them on contact with fluids. This arrangement has three useful characteristics: (i) the reagents for an assay can be applied to a sheet of paper before cutting the paper into discs of the appropriate size (rather than having to spot reagents in each detection zone); (ii) the discs are protected from light and the surrounding environment (this protection prevents contamination and decomposition of light-sensitive reagents); and, (iii) paper discs containing reagents for different assays can be mixed and matched when assembling a device to enable a large variety of devices using a single design. In this approach, the reagents in the disc need to be mobile and move with the solvent front; if they are not, then they could be spotted into the test zones on the bottom of the device.

In one or more embodiments, an applicator, for example, a pipette man is used to deposit assay reagents onto the hydrophilic material filling the openings within the fluid-impermeable layer. In other embodiments, an ink jet printer, plotter, or stamp is used to deposit assay reagents onto the hydrophilic material filling the openings within the fluid-impermeable layer.

The assay reagents embedded in the paper discs include protein assay reagents, other glucose assay reagents, sodium acetoacetate assay reagents, sodium nitrite assay reagents, or a combination thereof. Other suitable assay reagents will be apparent to one skilled in the art.

Figure 7:
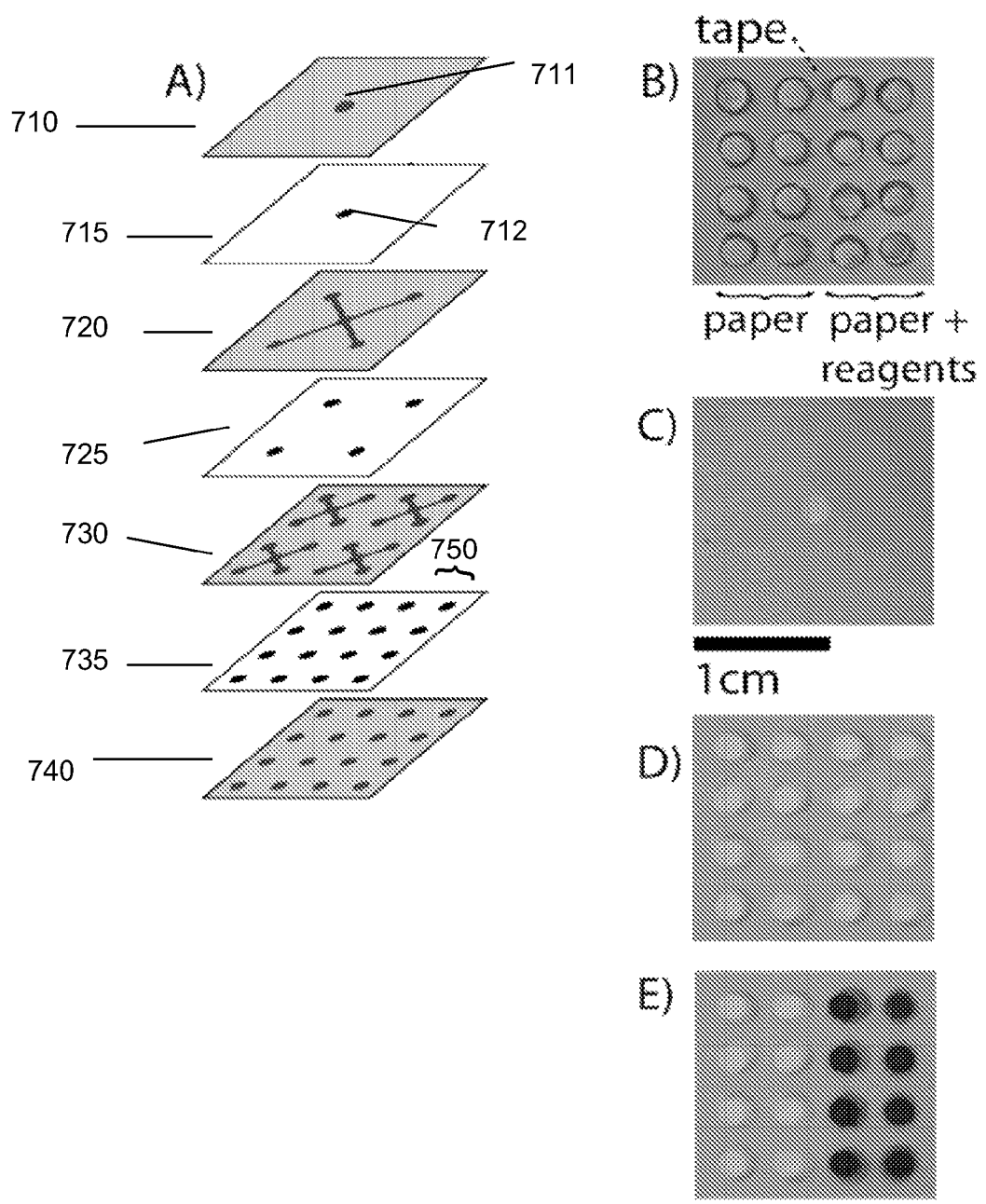
FIG. 7 illustrates a three-dimensional microfluidic device with reagents added to the paper discs within the openings of the tape layer to detect glucose.

In one specific embodiment, FIG. 7 shows a three dimensional microfluidic device with paper discs in the opening containing reagents for detecting glucose. The device is constructed using alternated layers of patterned paper layer 710, 720, 730, and 740 with hydrophilic regions conducting lateral flow and distributing fluid from a single fluid reservoir 711 into a 4×4 test zone and fluid-impermeable layers 715, 725, and 735, with opening 712 filled with paper disc conducting vertical flow. Some of the paper discs included in the device are cut from paper that contained the reagents required for the glucose assay (i.e., glucose oxidase, horseradish peroxidase, potassium iodide, and trehalose). The remainder are not spotted with reagent and can be used as controls. The microfluidic flow within the device follows the principle of lateral and vertical flow of the microfluidic device described above. FIG. 7A shows a schematic of the device. An inlet at the top of the device distributes a sample into 16 test zones at the bottom of the device. Before assembling the device, the reagents for the glucose assay are applied to half of the paper discs (right two columns of the device) in holes 750 of layer 735 connecting the test zones in the bottom layer of paper to the rest of the device, as shown in FIG. 7B. The left two columns are used as controls, or contains paper disc without added assay reagents. FIGS. 7C and 7D show the top and the bottom of the device respectively, before adding the sample containing glucose. FIG. 7E shows the bottom of the device 30 min after adding 40 µL of a 30-mM glucose solution to the top of the device, wherein the right two columns of detection zones show change of color due to the presence of glucose in the sample.

In another embodiment, the gap between the paper layers is filled with solid reagents for an application, such as bioassays, without using paper discs. The non-limiting examples of solid reagents for bioassay include solid protein assay reagents, solid glucose assay reagents, solid sodium acetoacetate assay reagents, solid sodium nitrite assay reagents, or a combination thereof. Other suitable assay reagents will be apparent to one skilled in the art.

In yet another embodiment, the opening within the fluid-impermeable layer is filled with seeds. Non-limiting examples of seeds include soybean seeds, hulls, and powdered soybean, or any other seeds that provide peroxidase to be used as a reagent.

In yet another embodiment, the opening within the fluid-impermeable layer is filled with filters to remove solid contaminants from a sample or to remove red blood cells from a blood sample. Non-limiting examples of filters include filter papers, any other filtration medium for removing solid contaminants, dextran, and any other materials that can remove red blood cells from a blood sample.

In yet another embodiment, the opening within the fluid-impermeable layer is filled with salts that either give off heat or absorb heat when dissolved in fluid to provide localized temperature control. Non-limiting examples of salts that give off heat when dissolved in fluid including magnesium sulfate. Non-limiting examples of salts that absorb heat when dissolved in fluid including ammonium nitrate. This provides a mechanism for local temperature device within the microfluidic devices. In certain embodiments, the microfluidic devices containing salt that give off heat when dissolved in fluid to heat assays. In certain other embodiments, the microfluidic devices containing salt that absorb heat when dissolved in fluid to cool assays. In yet certain other embodiments, the microfluidic devices containing salt that give off heat or absorb heat when dissolved in fluid to provide heating and cooling cycles for polymerase chain reactions.

In yet another embodiment, the opening within the fluid-impermeable layer is filled with gels that swell when fluid is added to them to provide contact between two layers of paper, or provide a mechanical force that activates an 'on' button. Non-limiting examples of gel include agarose, methylcellulose, and hylaronan.

In yet another embodiment, the opening within the fluid-impermeable layer is filled with magnetic particles. In the presence of a magnetic field, such magnetic particles could function as 'on' buttons in the device. Non-limiting examples of magnetic particles include iron oxide particles. In certain embodiments, the magnetic particles deposited in the openings of the fluid-impermeable layer would exert a force on one patterned paper layer and compress the paper to close a gap between paper and tape layers in the presence of an external magnet, thus resulting in a fluidic connection between two layers of paper.

In yet another embodiment, the opening within the fluid-impermeable layer is filled with materials to control the fluid flow through the device. These materials include a material that is selected for its wicking properties, solid materials such as sugars that dissolve when wet; and mixtures of sugars and polymer beads, such that fluid will only flow when sugar is present, and once all the sugar is dissolved, flow will stop. Non-limiting examples of sugars include sucrose. Non-limiting examples of polymers include polystyrene.

Controlled Mixing of Fluids

In one aspect, 3-D microfluidic devices that control the flow and mixing of fluids are described. The microfluidic devices include layers of patterned porous, hydrophilic layers, a fluid-impermeable layer with openings deposited between every two adjacent hydrophilic layers. In this aspect, one of the hydrophilic regions within a first patterned porous, hydrophilic layer of microfluidic device includes a first fluid flowing channel and a second fluid flowing channel which merge into a combination zone. The microfluidic device further include a mixing channel, formed by one of the hydrophilic regions within a second patterned porous, hydrophilic layer, and an unfilled opening within the fluid-impermeable layer disposed between the first and second patterned porous, hydrophilic layers. The unfilled opening is aligned with the combination zone and at least a portion of the mixing channel. In this aspect, the combination zone is capable of moving from a first spaced apart position, in which the combination zone is not in fluidic contact with the mixing channel, into a second contact position, in which the combination zone is in fluidic contact with the mixing channel.

In one or more embodiments, the devices can be programmed to mix fluids in specific combinations and sequences, and thus provide platforms for assays that require ordered events. In certain embodiments, 3-D microfluidic devices are used to mix four liquids (two at a time) or more, depending on the configuration of the device, to give six distinct combinations of fluids.

Many colorimetric and immunochromatographic assays require sequential reactions involving the delivery of analytes, reagents, and washing solutions. These assays necessitate either manual mixing of reagents in precise order, or mechanisms for controlling the position and rate that fluids move through a device. Three-dimensional devices may be advantageous in applications where a large number of samples need to be processed, or where a single sample need to be manipulated in a number of different ways.

Advantages of the 3-D microfluidic devices described herein include the ability to exert precise control over the dynamics of flow and mixing of fluids in paper, and low cost. Inexpensive, disposable, single-use devices provide a new tool for applications that require multiple tests to be performed quickly at low cost, and for tests that require multiple steps where several reagents need to be combined sequentially. Suitable applications include rapid testing in doctors' offices or emergency rooms; diagnosing disease in the developing world; and home healthcare for monitoring chronic disease.

Figure 8:
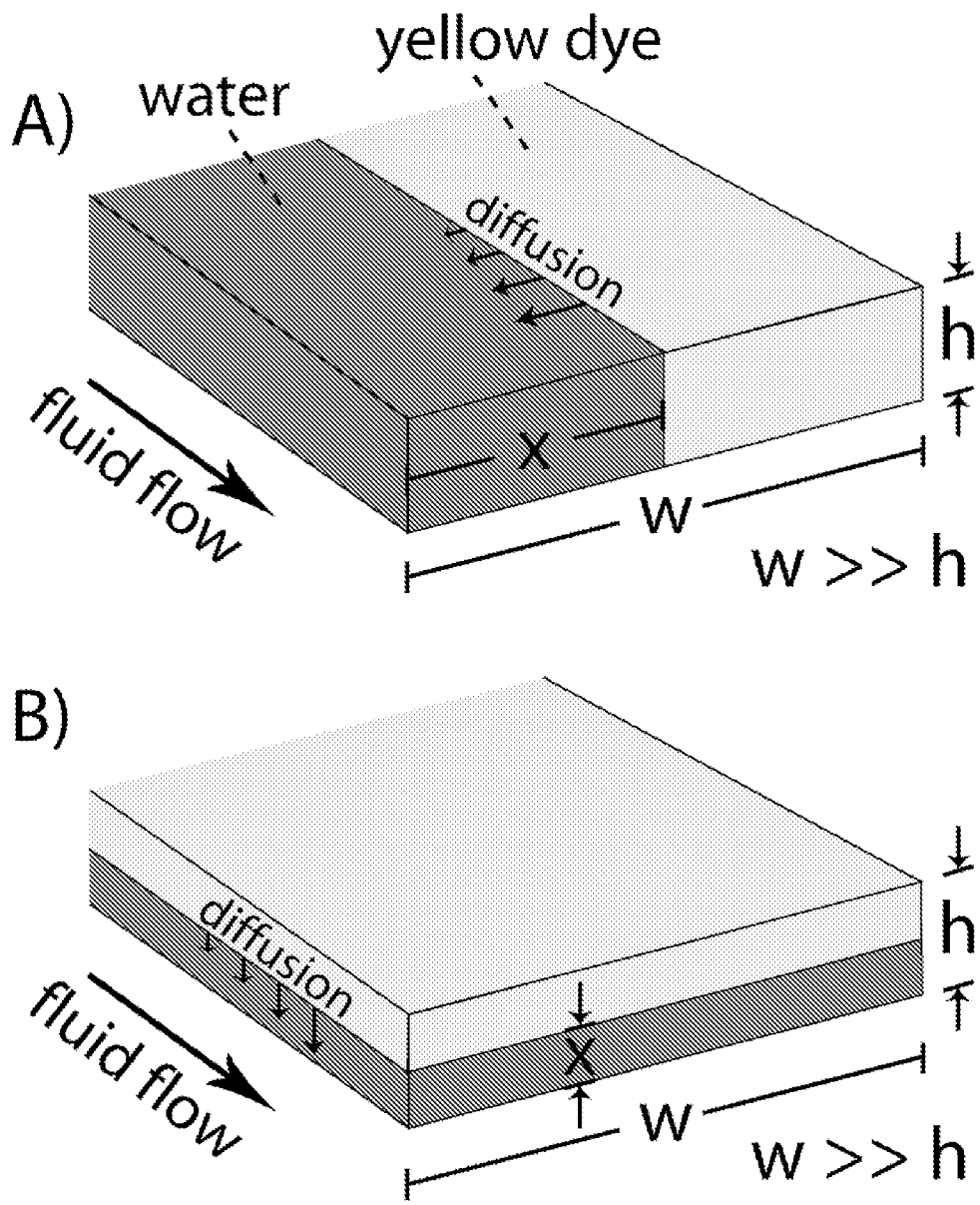
FIG. 8 illustrates two configurations of fluids in laminar flow in a paper channel.

Fluids move in microfluidic channels with laminar flow and low Reynolds numbers. The consequence of this behavior is that two fluids flowing next to one another mix by diffusion, not by convection. Diffusion of molecules in laminar flow occurs across the interface of the two fluids perpendicular to the direction of the flow, such as shown in FIG. 8A. The diffusion rate can be estimated using the Stokes-Einstein equation:

$$D = \frac{k_B T}{6\pi \mu R_m} \quad (1)$$

In this equation, D is the diffusion coefficient, $\mu$ is the viscosity of the fluid ($\mu \sim 1 \times 10^{-3}$ Pa·s for water at 20° C.), and $R_m$ is the radius of the molecule (for molecules of dye $R_m \sim 10$ Å). The diffusion coefficient for small molecules is $\sim 1 \times 10^{-6}$ cm$^2$/s, which means that two fluids (e.g., water and a yellow dye) in a side-by-side configuration, as shown in FIG. 8A, in a paper channel that is 1-mm wide would mix completely in ~5 min. This time scale is too slow for assays, and would require a 5-cm long channel in a paper-based microfluidic device for thorough mixing of fluids in two dimensions.

One way to solve this slow mixing step would be to decrease the width of a lateral flow channel. This approach, however, limits the quantity of fluid that can be transported through a channel, and is practical (using current technology) with channels that are only as narrow as 500 µm.

An arrangement of the fluids that would enable rapid mixing by diffusion would be a double-layer configuration, where one fluid would flow along the top half of the channel, and the second fluid would flow along the bottom half of the channel, as shown in FIG. 8B. This arrangement could minimize the distance that molecules need to diffuse to achieve mixing, but would not affect the width of the channel. For a channel that is 180 µm in height (defined by the thickness of Whatman chromatography paper 1), for example, the molecules in the fluids would diffuse across the height of the channel and mix thoroughly in ~5 s. Thus, a 1-mm long channel is sufficient for mixing fluids in a double-layer configuration.

FIGS. 8A and 8B illustrate the two configurations of fluids in laminar flow in a paper channel. The height of the channel (h) is defined by the thickness of the paper; the width of the channel (w) is defined by photolithography. The distance molecules need to diffuse in order to achieve complete mixing (x) is proportional to w or h, depending on the configuration of the fluids. FIG. 8A shows the typical side-by-side configuration of two fluids in a channel in laminar flow. The fluids are in contact along the longitudinal section of the channel. Molecules in one fluid diffuse into the other fluid in a direction that is perpendicular to the direction of fluid flow. In this configuration, the molecules need to diffuse across half the width of the channel to mix with the other fluid. In FIG. 8B an ideal double-layer configuration for mixing two fluids by diffusion in a channel in laminar flow is shown. The distance the molecules in one fluid needs to diffuse to mix with the other fluid is half the height of the channel.

In 2-D paper-based microfluidic devices, fluids are introduced side-by-side in a channel as shown in FIG. 8A. 3-D devices, on the other hand, offer the possibility to introduce fluids in a double-layer configuration, as shown in FIG. 8B, for rapid and thorough mixing.

Figure 9:
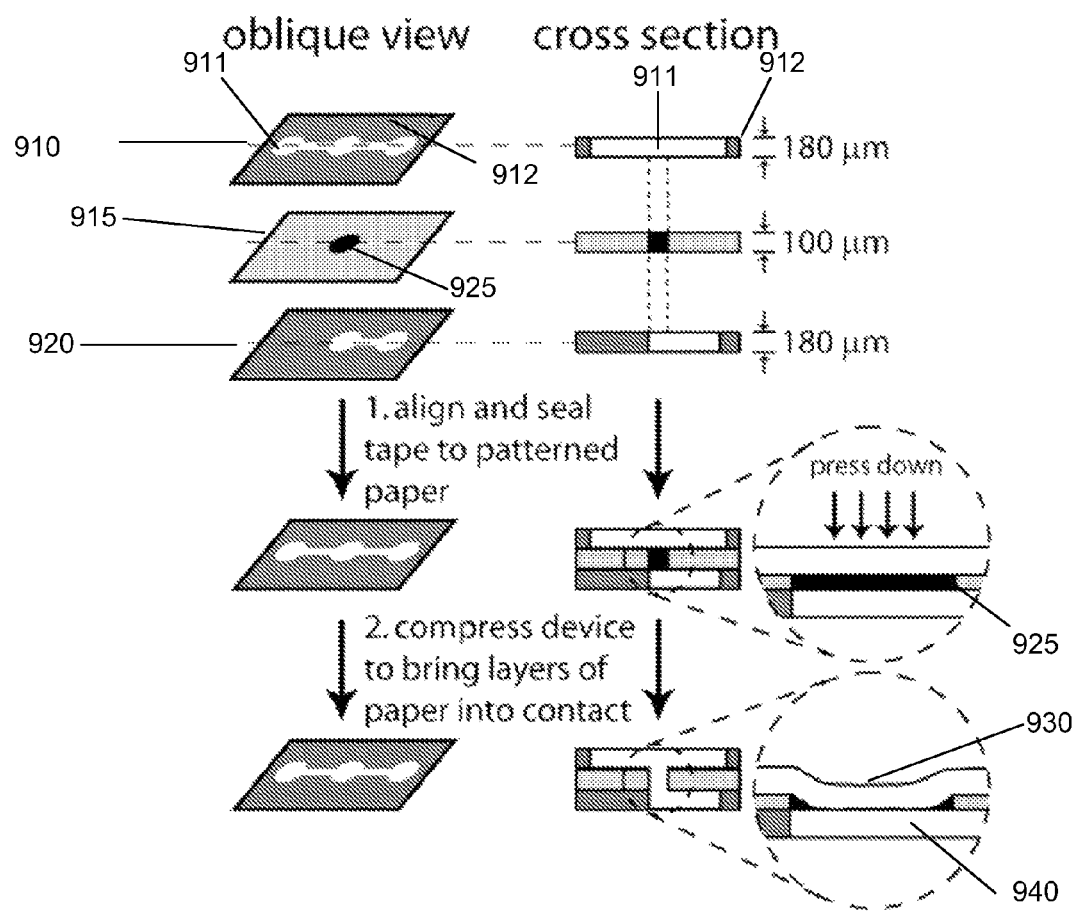
FIG. 9 is a schematic illustration of a three-dimensional microfluidic mixer made out of patterned paper and double-side tape.

In one aspect, a microfluidic mixer which mix two fluids in a double-layer configuration as they move through the device is described with reference to FIG. 9. The microfluidic device is constructed using alternated layers of patterned paper 910, 920, with hydrophilic regions conducting lateral flow and fluid-impermeable layer 915 with opening 925 aligned between the two paper layers. The microfluidic flow within the device follows the principle of lateral and vertical flow of the microfluidic device described above. FIG. 9 illustrates in oblique view (left-hand side) and in cross-section (right-hand side) a scheme for fabricating 3-D microfluidic devices out of patterned paper and tape. As shown in FIG. 9, each layer of paper is patterned with microfluidic channels comprising hydrophilic paper 911 (white regions) that wick fluids in the horizontal plane and hydrophobic polymer 912 (grey regions) that control the distribution of fluid within each layer of paper. The layers of double-sided tape separate the hydrophilic channels in adjacent layers of paper from one another. A hole is punched into the layer of tape. The device fabrication methods are similar to those described above in FIG. 2, but instead of inserting paper discs into the holes in the tape to provide contact between adjacent layers, no paper disc is used. To cause flow, the parts of the hydrophilic regions within the patterned paper that are in alignment with the opening 925 within the tape layers are pressed to bring them into contact with each other at the tape hole location. Specifically, as shown by FIG. 9, the hydrophilic region 930 above the hole within the tape is pressed down through the hole so that the hydrophilic region 930 is in direct contact with hydrophilic region 940. The parts of hydrophilic regions of paper in alignment with the hole are pressed to close the 100 μm gap that is created by the tape. The pressed hydrophilic regions contact one another and enable fluids to wick from one layer of paper to the next.

In certain embodiments, the layers are selected so that the surface tension of the liquid in the channel region prevents the fluid from flowing through the void created by the unfilled aperture in the separating layer. This can be accomplished by controlling the dimensions (e.g., height and diameter of the aperture) and the materials selected for the hydrophobic wall, hydrophilic porous region and separating layer. In certain specific embodiments, more than one fluid-impermeable layer with identical unfilled-openings are disposed between two adjacent patterned porous, hydrophilic layers to provide a wider gap between the two adjacent hydrophilic layers to limit fluidic flow between the two hydrophilic layers.

In one embodiment, a 3-D paper-based microfluidic mixer designed for mixing fluids quickly and completely in a short fluidic path in paper is described with reference to FIG. 10A shown in oblique view (left-hand side) and cross-section (right-hand side). The 3-D mixer has a top layer of paper 1000 with two microfluidic channels 1010, 1012 leading into a central combining zone 1014. As shown in FIGS. 10B and 10C, the two fluids meet in this zone 1014 and form an interface 1018 that is easily discernable in FIGS. 10B and 10C. The direction of the interface is dictated by the line that forms when the two fluids meet as illustrated by 1018. The 3-D microfluidic mixer also include a second layer of paper 1020 that wicks the fluids from the combining zone 1014 into a mixing channel 1022 as shown in FIGS. 10A and 10C. A layer of tape 1024 containing a hole is disposed between the two layers of patterned paper. As shown in FIG. 10A, the part of the hydrophilic region within the top layer which forms the combining zone is pressed down to provide contact with the hydrophilic region in the bottom layer to optimize fluids to wick between paper layers.

Fluids mix in the 3-D microfluidic mixer are mixed by the mechanism shown in FIG. 8B, where they interact with one another over the 180 μm thickness of paper. In order to provide a better visual presentation of the mixing event, a thick 3-D microfluidic device (1.5 mm), instead of the typical 180-μm thick device, is used (shown in FIG. 10C). The microfluidic mixer is assembled using a top layer of patterned paper (180-μm thick), a bottom layer of patterned blotting paper (1.5-mm thick), and a tape layer with a hole in between the two paper layers. The thick blotting paper allows for easy visualization of the fluids as they move through the 3-D combining zone (FIG. 10C). FIG. 10C shows a longitudinal section of the 3-D mixer and the distribution of yellow and blue dyes as they wick through the device from the combining zone into the mixing channel.

Figure 10:
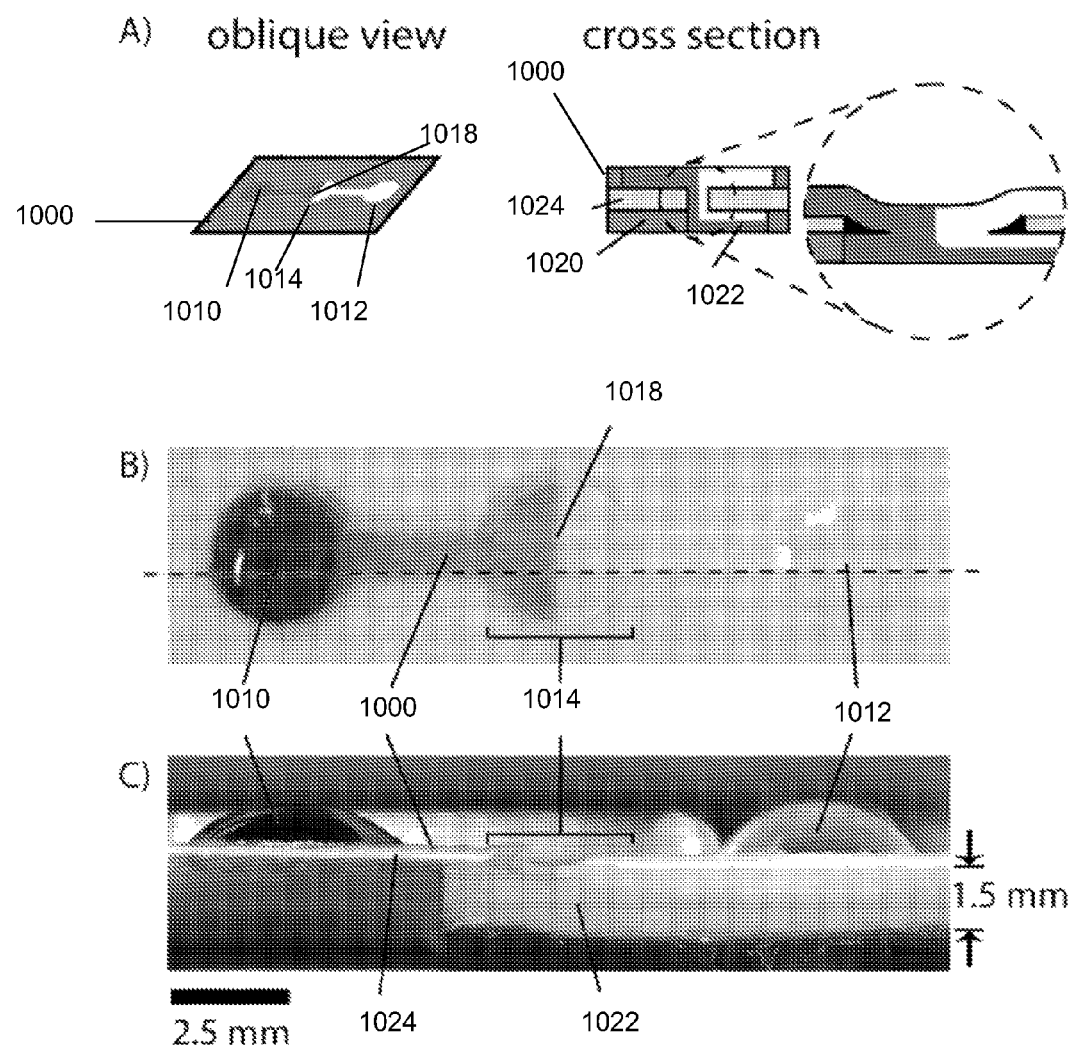
FIG. 10 illustrates a three-dimensional microfluidic mixer for mixing a blue dye with a yellow dye.

FIG. 10 also demonstrates the mechanism of mixing in 3-D microfluidic mixer. FIG. 10A shows oblique and cross-sectional views of a mixer showing the theoretical movement of fluid (blue and yellow aqueous solutions). The blue and yellow solutions form an interface in the combining zone and become layered as they exit the combining zone and enter the mixing channel. FIG. 10B is a top view of the mixer showing the interface between blue and yellow solutions. The solutions are 1 mM erioglaucine (blue) and 1 mM tartrazine (yellow). FIG. 10C is a cross-sectional view of a mixer comprised of Whatman filter paper 1 (180 μm thick) layered on top of tape (100 μm thick), and connected to a bottom layer of blotting paper (1.5 mm thick). The thick blotting paper is used to facilitate observations of fluid dynamics in the mixer. The photograph in FIG. 10A highlights the double-layer configuration of the blue and yellow solutions as they mix with each other. In this embodiment, the orientation of the mixing channel is perpendicular to the interface of the two fluids within the combining zone.

In another embodiment, a microfluidic mixer that controls the mixing of two fluids is described. As indicated above, the orientation of the mixing channels in the bottom layer of paper in relation to the interface within the combining zone dictates whether fluids mix in the combining zone, or whether they exit the zone with parallel laminar flows. When the mixing channel is parallel to the interface, for example, the fluids form an interface in the combination zone, but do not mix in the mixing channel. Instead, the fluids exit the mixing channel in parallel laminar flows and fill a detection region with well-defined separation between the fluids. In contrast, when the mixing channel is perpendicular to the interface, the fluids become layered on top of one another as they exit the combining zone and enter the mixing channel, resulting in a well-mixed fluid. Since the fluids become layered in the 180-μm thick paper, they quickly mix as they move through the mixing channel. The extent of fluidic mixing in the 3-D microfluidic mixer is independent of the length of the mixing channel when the mixing channel has a length of more than 1 mm.

Figure 11:
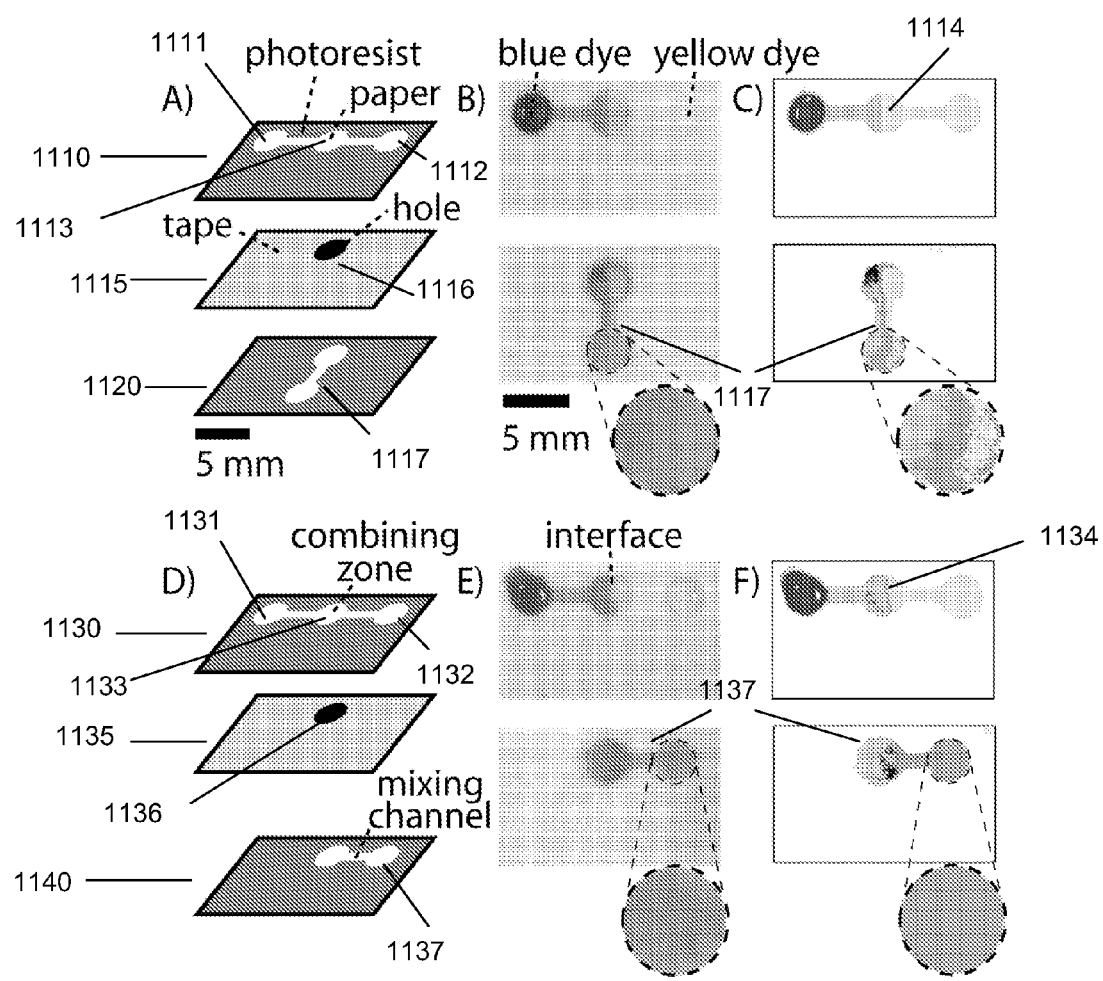
FIG. 11 illustrates two three-dimensional microfluidic mixers with different orientations of the mixing channels with respect to the interfaces of the fluids.

FIG. 11 illustrates the effect of the orientation of the mixing channel relative to the interface on fluid mixing. Two 3-D microfluidic mixers as shown in FIGS. 11A-11C and 11D-11F that direct two fluids into a single mixing channel are compared. In the microfluidic mixer shown in FIGS. 11A-11C, the mixer includes patterned paper layer 1110 and 1120, as well as a tape layer 1115 disposed between the two paper layers. Top paper layer 1110 include two hydrophilic channels 1111 and 1112, which merge into a combining zone 1113. Two liquids (blue dye and yellow) are deposited in channels 1111 and 1112, and an interface 1114 of the two fluids (blue dye and yellow) within the combining zone 1113 is shown in FIG. 11C. An aperture 1116 in the tape layer 1115 is aligned with combining zone 1113 and is also in alignment with mixing channel 1117 in paper layer 1120. The mixer is pressed so that combining zone 1113 is pressed down into aperture 1116 and is in contact with mixing channel 1117. In this case, the interface 1114 is parallel to the direction of the mixing channel. Thus this mixer as shown does not lead to efficient mixing of fluids.

In the microfluidic mixer shown in FIGS. 11D-11F, the mixer includes patterned paper layer 1130 and 1140, as well as a tape layer 1135 disposed between the two paper layers. Top paper layer 1130 include two hydrophilic channels 1131 and 1132, which merge into a combining zone 1133. Two liquids (blue dye and yellow) are deposited in channels 1131 and 1132, and an interface 1134 of the two fluids (blue dye and yellow) within the combining zone 1133 is shown in FIG. 11F. An aperture 1136 in the tape layer 1135 is aligned with combining zone 1133 and is also in alignment with mixing channel 1137 in paper layer 1130. The mixer is pressed so that combining zone 1133 is pressed down into aperture 1136 and is in contact with mixing channel 1137. In this case, the interface 1134 is perpendicular to the direction of the mixing channel. Thus in contrast, the two fluids mix readily as shown in FIGS. 11D-11F according to the mechanism shown in FIG. 8B and in the example shown in FIG. 10C. FIGS. 11A and 11D are schematics of the three layers in the devices. The difference between the two mixers is the orientation of the mixing channel in the bottom layer with respect to the interface of the fluids in the top layer. In mixer 11A, the bottom mixing channel runs parallel to the interface. In the mixer shown in FIG. 11D, the mixing channel runs perpendicular to the interface. FIGS. 11B and 11E are photographs of the mixers (top and bottom) after wicking blue and yellow aqueous dyes into the channels. In FIG. 11B, the fluids do not mix as they are wicked down the mixing channel. In FIG. 11E, the fluids mix efficiently. FIGS. 11C and 11F are the same images as in FIGS. 11B and 11E respectively, with enhanced contrast and brightness to highlight the differences in mixing between the two devices. In FIG. 11E, the color of the collection zone is uniform, indicating that the two dyes are mixed efficiently. In 11C, the collection zone shows distinct areas of blue, green and yellow, indicating that this design does not lead to efficient mixing.

Figures 12A, 12B:
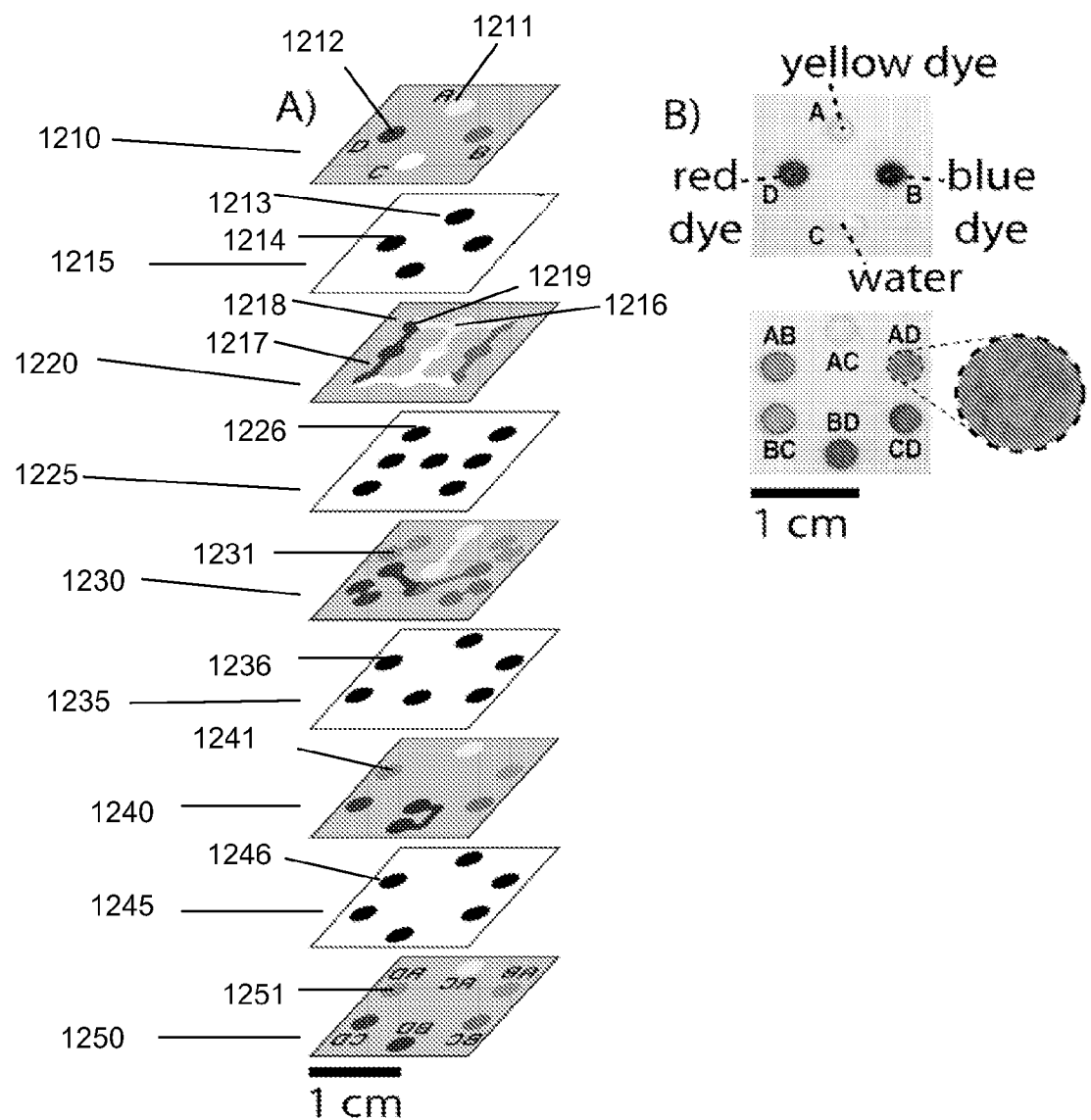
FIG. 12 illustrates a three-dimensional microfluidic mixer for mixing four fluids, two by two, in all possible six combinations.

In another embodiment, a 3-D microfluidic mixer to control the mixing of more than two fluids is described. In yet another embodiment, a 3-D microfluidic mixer that mix four fluids, two by two, to give all six possible combinations of fluids is described with reference to FIGS. 12A and 12B. The microfluidic mixers are assembled with a plurality of layers of patterned paper and a tape layer with a hole disposed between every two adjacent paper layers. As described above, the hydrophilic regions within the combining zone are pressed to enable contacts between the two paper layers and optimize vertical microfluidic flow. This design demonstrates the flexibility of the 3-D mixer. The channels in the top layer do not necessarily have to enter the combining zone when oriented 180° from one another; they can enter from any orientation. As shown in FIGS. 12A and 12B, the mixing channels for fluid A and B, A and C, A and D, B and C, B and D, C and D are perpendicular to their respective interfaces, thus allowing efficient mixing of the fluids. As indicated in FIG. 12, fluid A is yellow dye; fluid B is blue dye; fluid C is water; and fluid D is red dye.

Figures 12C, 12D:
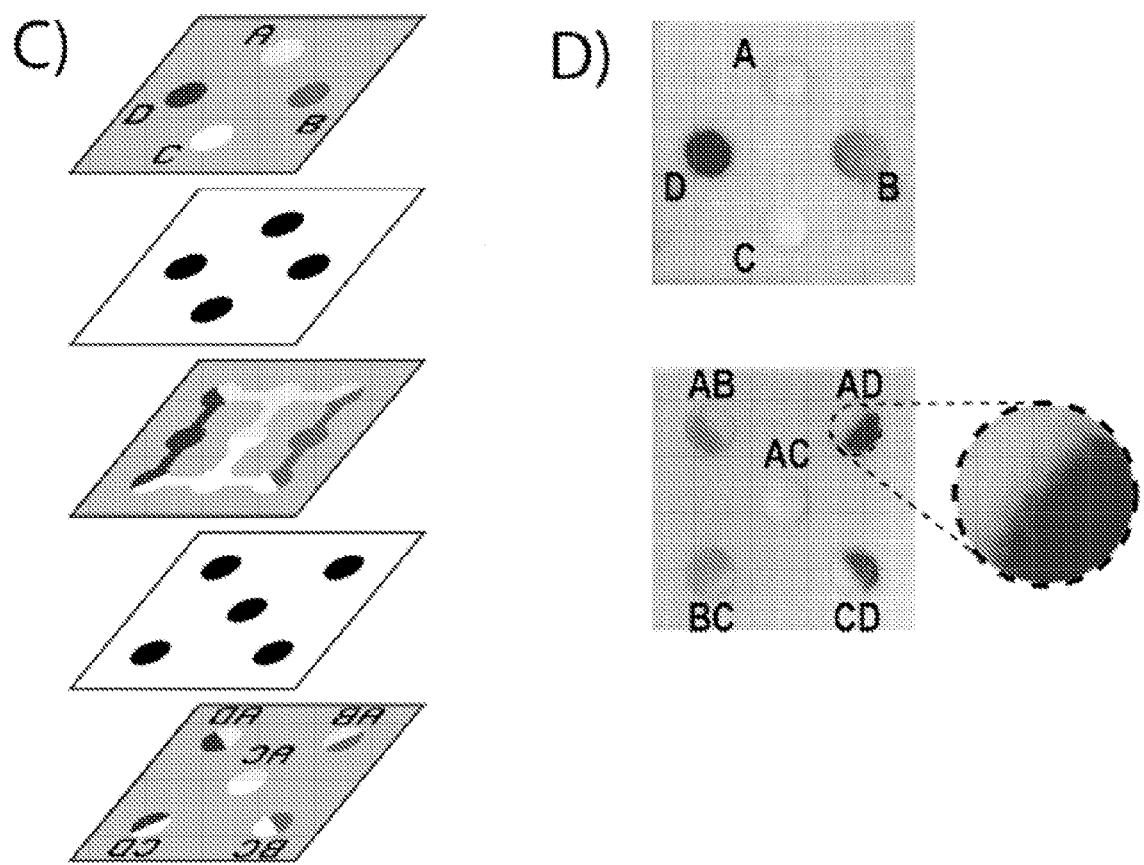

FIGS. 12C and 12D show a device that does not incorporate 3-D mixers. The microfluidic mixer are assembled with a plurality of layers of patterned paper and a tape layer with a hole disposed between every two adjacent paper layers. As described above, the hydrophilic regions within the combining zone are pressed to enable contacts between the two paper layers. This device illustrates the well-defined interface created when two fluids meet in the combining zone. This interface can be maintained through several layers of paper (not shown), so long as the outlet channels are not perpendicular to the interface of the two fluids.

FIGS. 12A-12D shows the details of two three-dimensional microfluidic mixers for mixing or combining multiple fluids simultaneously. Both devices have four input zones for adding fluids to the device, though other three-dimensional microfluidic mixers that could accommodate even more fluids are contemplated. The first device (FIGS. 12A and 12B) mixes fluids, two by two, in all six possible combinations and delivers the products into six output wells on the bottom of the device. The second device (FIGS. 12C and 12D) combines the fluids—but does not mix them—and delivers the combined fluids into five output wells on the bottom of the device. The sixth combination is left off the device for simplicity in design. Schematics of the layers used in the devices are shown in (FIGS. 12A and 12C). As shown in FIG. 12A, the microfluidic mixer includes patterned paper layers 1210, 1220, 1230, 1240, 1250 and tape layers 1215, 1225, 1235, 1245. Fluid A and D are deposited in hydrophilic region 1211 and 1212, respectively. Fluid A (yellow dye) flows through hole 1213 filled with a paper disc in tape layer 1215 into channel 1216 in paper layer 1220. In a similar manner, Fluid D (red dye) flows through hole 1214 filled with a paper disc in tape layer 1215 into channel 1217 in paper layer 1220. Channels 1216 and 1217 merge into a combining zone 1218, which defines an interface 1219 of the two fluids. The combining zone 1218 is in alignment with an unfilled aperture 1226 within tape layer 1225. The aperture 1226 is in alignment with a mixing channel 1231 within paper layer 1230. The mixer is pressed so that combining zone 1218 is pressed down into unfilled aperture 1226 and is in contact with mixing channel 1231. In this case, the interface 1219 is perpendicular to the direction of the mixing channel 1231 thus allows efficient fluid mixing. The mixed fluid then flows through aperture 1236 filled with a paper disc within tape layer 1235, hydrophilic region 1241 within paper layer 1240, aperture 1246 filled with a paper disc within tape layer 1245, and eventually reaches hydrophilic region 1251 within paper layer 1250, resulting a well-mixed mixture of fluids A and D. The four input wells at the top of the devices are labeled A, B, C and D. The six output wells on the bottom of the device are labeled AB, AC, AD, BC, BD and CD. Following the similar principle, fluids A and B, A and C, B and C, B and D, C and D are also mixed in the mixer as shown in FIG. 12A and FIG. 12B. As a comparison, the second device (FIGS. 12C and 12D) combines the fluids—but does not mix them—and delivers the combined fluids into five output wells on the bottom of the device. FIGS. 12B and 12D show the top and bottom of the devices after allowing water and red, yellow, and blue aqueous dyes to wick through the device. In FIG. 12B the dyes mixed with each other as they are wicked through the device to yield six distinguishable colors: red (red dye+water), orange (red dye+yellow dye), yellow (yellow dye+water), green (yellow dye+blue dye), blue (blue dye+water) and purple (blue dye+red dye). In FIG. 12D, the four initial colors remain unchanged as they are distributed into the five output wells, even though they are in direct contact with another color.

In yet another embodiment, a 3-D microfluidic mixer could be incorporated into any 3-D microfluidic devices. In yet another embodiment, a 3-D microfluidic mixer requires two layers of patterned paper and one layer of tape with holes disposed between the two paper layers, and occupies ~1 mm×1 mm×~500 µm of space on a device. An important feature that contributes to mixing is the orientation of the mixing channel to the interface of the two fluids formed in the combining zone. The remaining portions of the 3-D mixer can be modified substantially without affecting its ability to mix fluids.

The advantages of the described embodiments include the ability to control how fluids interact with one another in the context of an inexpensive, disposable, autonomous paper-based device should enable many applications that require precise handling of fluids. Dipsticks are a ubiquitous example of simple devices that incorporate fluid handling and mixing in a lateral flow format. Three-dimensional microfluidic devices provide a greater level of control than do dipsticks because they enable simultaneous mixing of several fluids, and because they can be programmed to mix fluids in a precise pattern. Other advantages include low cost because the devices are fabricated from paper and tape, and ease of assembly without the need for specialized equipment. In addition, the devices can be used to process many fluids simultaneously.

On and Off Buttons for Programming Fluid Flow

In one aspect, a microfluidic flow control device with an "on" button is described. The microfluidic flow control device includes a plurality of porous hydrophilic layers including a first and second patterned porous hydrophilic layer which define a first flowing channel and a second flowing channel, respectively. The microfluidic flow control device further includes a fluid-impermeable layer disposed between every two adjacent patterned porous, hydrophilic layers. The fluid-impermeable layer disposed between the first and the second patterned hydrophilic layers contains one unfilled opening that is aligned with at least portions of the first and second fluid flowing channel. At least a portion of the first flowing channel is capable of moving from a first spaced apart position, in which the first flowing channel is not in fluidic contact with the second flowing channel, into a second contact position, in which the first flowing channel is in fluidic contact with the second flowing channel.

In another aspect, a microfluidic flow control device with an "off" button is described. The microfluidic flow control device includes a first and second patterned hydrophilic layers with a fluid-impermeable layer disposed in between. The fluid-impermeable has opening and a hydrophobic plug is disposed in one of the openings. The hydrophobic plug includes a low-melting-point hydrophobic material capable of melting and flowing at a pre-selected temperature. The second patterned hydrophilic layer has a hydrophilic region which is in alignment with the hydrophobic plug. In use, the hydrophobic plug is heated to melting and the melted material flows into the hydrophilic region below to obstruct microfluidic flow within the hydrophilic region.

In one embodiment, a microfluidic flow control device programs the fluid flow within the microfluidic devices made out of patterned paper layers and tape layers using single-use 'on' or 'off' buttons. The buttons allow fluids to wick either through a channel ('on' button), or stop the movement of fluid in a channel ('off' button). The buttons are formed in three-dimensional (3-D) microfluidic devices. The layered structure of 3-D devices allows for the design of buttons, which add significant function to these devices, without adding complexity to the structure of the device.

In some embodiment, the 'on' and 'off' buttons are formed by compression, and involve either pressing parts of two hydrophilic regions within the patterned paper layer ('on'), or inducing hydrophobic, low melting point wax embedded within the holes of the tape layers into a hydrophilic channel ('off'). The buttons are simple and easy to use, and can be compressed for programming the fluidic devices for a variety of functions.

In other embodiments, microfluidic devices contain the 'on' and 'off' buttons which can be configured with fluidic channels to form AND, OR, NAND, NOR, NOT, XOR, and XNOR logic gates, and that these logic gates can be used as the basis for an exceedingly simple, prototype, single use fluidic computer. In another embodiment, a microfluidic de-multiplexer is also described.

Programmable microfluidic devices made out of paper have the desirable feature of allowing the user to have greater control over the function of the device. The function of most microfluidic devices is pre-determined by the design of the device: fluids will flow through the channels in a specific sequence. With a programmable device, the user can choose which channels or areas of the device should be filled with fluid and which areas should not. This can be useful in situations where only a limited quantity of sample is available, or where a generic set of channels (and device) need to be programmed to perform a certain function over another. With programmable devices, the user can also 'turn on' a channel at any arbitrary time. This could be useful in situations where reagents need to be mixed in a timed sequence.

In other embodiments, three-dimensional microfluidic flow control devices with logic gates based on "on" or "off" buttons are described. The "on" and "off" buttons in 3-D microfluidic devices can be used to make very complex devices. The logic gates can also be useful for programming specific function into the devices.

In yet another embodiment, microfluidic flow control devices with 'on' or 'off' buttons are described with reference to FIG. 13. The microfluidic flow control device is constructed using alternated layers of patterned paper with hydrophilic regions conducting lateral flow and fluid-impermeable layers with opening. When the layers of patterned paper and tape with unfilled holes are stacked, there is a small gap within the holes in the tape layer between the two adjacent patterned layers of paper that is created due to the thickness of the tape. Thus the parts of the two hydrophilic regions within the two adjacent paper layers in alignment with the hole or opening are not in contact with one another. As a result, vertical fluidic flow from one layer of paper to the other is not optimized unless this gap is filled with a small disc of paper or some other hydrophilic material, or if the gap is closed by pressing the part of the hydrophilic region in alignment with the opening using mechanical force. This mechanical mechanism creates an 'on' button, since vertical fluidic flow is optimized when the layers of paper are compressed and are in contact. The microfluidic flow control device in FIGS. 13A-13D illustrates this design. The input from the user is the compression of the layers. The output is fluid flowing into a specific channel. The 'on' buttons within the microfluidic flow control device can be pressed at any time, both before the device is used, and while the device is being used.

Figures 13A, 13B, 13C, 13D:
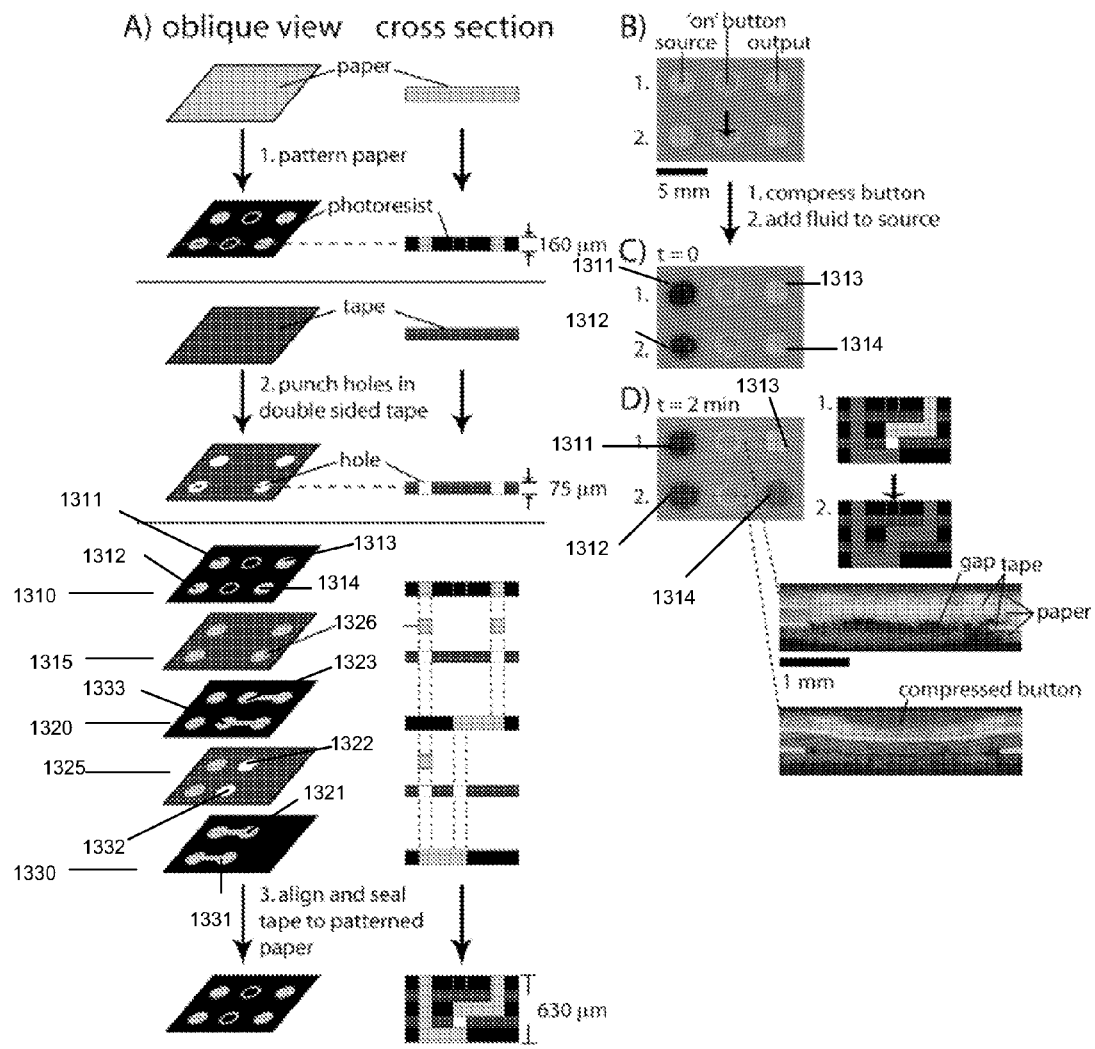
FIG. 13 illustrates three-dimensional microfluidic devices with single-use "on" and "off" button.

FIG. 13A is a schematic for the fabrication of 'on' buttons. The microfluidic flow control device includes paper layer 1310, 1320, 1330 and tape layer 1315, 1325. Layers of paper are patterned using photoresist. Layers of tape are punched to created holes or openings within. The layers of patterned paper and tape are aligned and stacked. Holes such as 1326 filled by pieces of paper are illustrated by grey ovals in FIG. 13A. Holes 1322 and 1332 are without any fillings and are illustrated by white ovals in FIG. 13A. If the holes in the tape are not filled with a paper disc (white ovals), then there will be a small gap between the layers of paper and fluids will not efficiently wick from one layer of paper to the other through the unfilled holes. When the 'on' button is compressed, i.e., when the parts of hydrophilic regions in alignment with the unfilled opening are compressed, the gap is closed, the parts of the hydrophilic regions within two adjacent paper layers are in contact, and fluids can wick efficiently from one layer of paper to the other vertically. Two fluids are deposited in the hydrophilic regions within the top paper layer 1310 as indicated in FIG. 13C. FIG. 13B shows an assembled device with two 'on' buttons and button 2 is activated by compression (as indicated by the arrow). Specifically, the two fluids are deposited into hydrophilic regions 1311 and 1312 within paper layer 1310, which reach hydrophilic regions 1321 and 1331 within the bottom paper layer 1330, respectively, by capillarity through the device. Hydrophilic region 1333 within paper layer 1320 is in alignment with unfilled aperture 1332, which is in alignment with a portion of hydrophilic region 1331. The microfluidic flow control device is pressed so that region 1333 is pressed into aperture 1332 and is in contact with a portion of channel 1331. Thus the fluid deposited at 1312 will flow through pressed aperture 1332 and eventually reach hydrophilic region 1314 within the top paper layer 1310, as shown by FIG. 13D. On the other hand hydrophilic region 1323 within paper layer 1320 is in alignment with unfilled aperture 1322, which is in alignment with a portion of hydrophilic region 1321. The region 1323 is not pressed and thus is not in contact with any portion of channel 1321. As a result, the fluid deposited at 1311 will not flow through un-pressed aperture 1322 and can not reach hydrophilic region 1313 within the top paper layer 1310, as shown by FIG. 13D. FIGS. 13C and 13D show that a fluid is deposited at two hydrophilic regions, and fluid only reaches the output No 2 where the 'on' button is compressed. Also shown in FIG. 13D are two photographs of the cross sections of the uncompressed button 1 and compressed button 2. In the photograph of the compressed button, parts of hydrophilic regions from two layers of paper are in contact with each other and the vertical flow occurred efficiently. In comparison, the photograph of the uncompressed button shows that vertical flow did not occur efficiently.

Figures 13E, 13F, 13G:
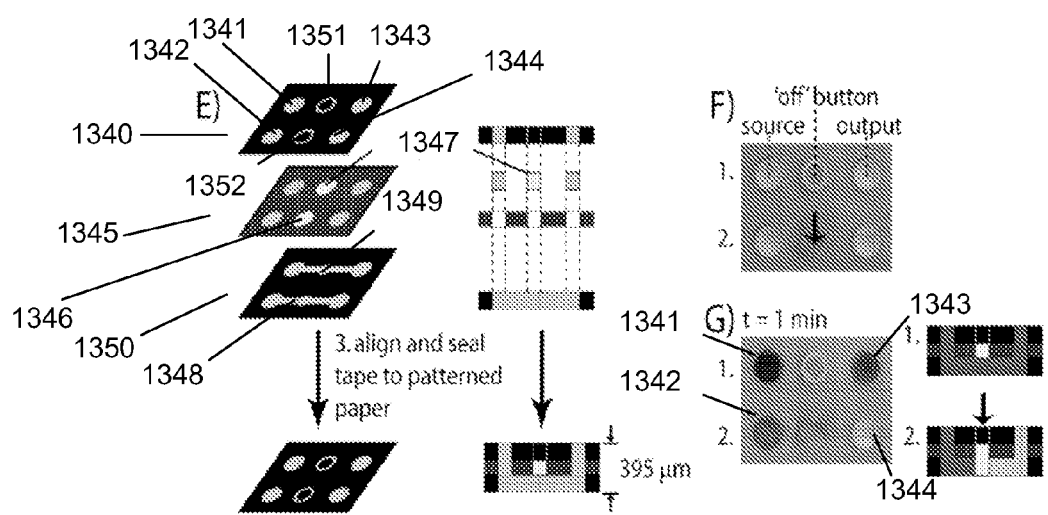

In one aspect, a microfluidic flow control device with an 'off' button is described. The microfluidic flow control device is constructed using alternated layers of patterned paper with hydrophilic regions conducting lateral flow and fluid-impermeable layers with opening containing low-melting-point hydrophobic materials. In one embodiment, the small gap between the layers of paper that is created due to the thickness of the tape is filled with a small paper disc soaked in a low melting point wax. Suitable waxes include candle wax, cheese wax, packaging wax, paraffin wax, or other waxes. In some embodiments, waxes that melt below 200° C. are used. In other embodiments, waxes with melting points below 100° C. are used. In a specific embodiment, bayberry wax (mp=45-50° C.) is used. When the paper disc containing wax is compressed with a hot glass rod, the wax melts and fills the channel beneath it, creating a hydrophilic barrier in the hydrophilic channel that is at least in partial alignment with the paper disc, thus blocking fluid from wicking across the channel (FIGS. 13E-13G). FIG. 13E is a schematic for the fabrication of microfluidic flow control device with 'off' buttons. This microfluidic flow control device includes patterned paper layer 1340 and 1350 with a tape layer 1345 disposed in between. Two fluids are deposited into hydrophilic regions 1341 and 1342 within paper layer 1340, respectively. Through microfluidic flow, the two fluids will reach hydrophilic regions 1349 and 1348, respectively. Aperture 1346 within tape layer 1345 is filled with hydrophilic wax paper and is in alignment with hydrophilic region 1348 within paper layer 1350, and is also in alignment with area 1352 within paper layer 1340. When area 1352 is compressed with a hot object, the wax within aperture 1346 melts, flow into channel 1348 and block the channel. On the other hand, aperture 1347 within tape layer 1345 is filled with hydrophilic wax paper and is in alignment with hydrophilic region 1349 within paper layer 1350, and is also in alignment with area 1351 within paper layer 1340. When area 1351 is not compressed with a hot object, the wax within aperture 1347 does not flow. Thus, fluid deposited at region 1341 flow through channel 1349 and reach hydrophilic region 1343 within the paper layer 1340. FIG. 13F shows this device with the two 'off buttons', i.e., apertures 1346 and 1347. Button 2 (aperture 1346) is activated by compressing it with a hot glass stirring rod. FIG. 13G shows that two fluids are added to regions 1341 and 1342 and only fluid deposited at 1341 reaches the output 1343 at right where the "off" button is not activated.

In one or more embodiments, 3-D microfluidic flow control devices with both "on" and "off" buttons are described. In other embodiments, 3-D microfluidic flow control devices with both "on" or "off" are assembled to create the functions of the logic gates such as AND, OR, NOT, NAND, NOR, XOR, or XNOR. Such microfluidic devices and their logic functions are described in Examples.

In addition, the basic logic gates described above could be assembled to form a half adder, as well as other combinations to perform digital computation.

In certain embodiments of the above-mentioned aspects, porous, hydrophilic layers include any hydrophilic substrate that wicks fluids by capillary action. In one or more embodiments, the porous, hydrophilic layer is paper. Non-limiting examples of porous, hydrophilic layers include chromatographic paper, filter paper, nitrocellulose and cellulose acetate, cellulosic paper, filter paper, paper towels, toilet paper, tissue paper, notebook paper, KimWipes, VWR Light-Duty Tissue Wipers, Technicloth Wipers, newspaper, any other paper that does not include binders, cloth, and porous polymer film. In general, any paper that is compatible with the selected patterning method may be used. In certain embodiments, porous, hydrophilic layers include Whatman chromatography paper No. 1.

In certain embodiments of the above-mentioned aspects, the hydrophilic layer is patterned following the procedures described in PCT/US07/081848. In certain embodiments, the hydrophilic paper is soaked in photoresist, and photolithography is used to pattern the photoresist to form the barriers following the procedures described in PCT/US07/081848. Other hydrophilic material such as nitrocellulose and cellulose acetate are commonly used and well-known membranes for their use in fluid diagnostics, but are not compatible with solvents typically used in photolithography. So other methods would be more suitable for patterning them. In addition, the hydrophilic layer and the hydrophobic barrier regions could be prepared using materials that are compatible with the testing conditions, e.g., temperature, pH, and/or ionic strength.

In certain embodiments of the above-mentioned aspects, the photoresist used for patterning porous, hydrophilic material include SU-8 photoresist, SC photoresist (Fuji Film), poly(methylmethacrylate), nearly all acrylates, polystyrene, polyethylene, polyvinylchloride, and any photopolymerizable monomer that forms a hydrophobic polymer.

In certain embodiments of the above-mentioned aspects, the fluid-impermeable layer is a sheet that is not soluble in the fluid of the microfluidic device and that provides the desired level of device stability and flexibility. In one or more embodiments, the fluid-impermeable layer is a plastic sheet. In certain embodiments, the fluid-impermeable layer is an adhesive sheet or tape. Non-limiting examples of fluid-impermeable layer includes Scotch® double-sided carpet tape, water-impermeable barriers include 3M Double Sided Tape, Tapeworks double sided tape, CR Laurence black double sided tape, 3M Scotch Foam Mounting double-sided tape, 3M Scotch double-sided tape (clear), QuickSeam splice tape, double sided seam tape, 3M exterior weather-resistant double-sided tape, CR Laurence CRL clear double-sided PVC tape, Pure Style Girlfriends Stay-Put Double Sided Fashion Tape, Duck Duck Double-sided Duct Tape, and Electriduct Double-Sided Tape. In certain specific embodiments, double-sided tape is used as the fluid-impermeable layer. Double-sided tape adheres to two adjacent layers of patterned paper and can bind to other components of the microfluidic device. It is impermeable to water, and isolates fluid streams separated by less than 200 μm. In addition, it is also sufficiently thin to allow adjacent layers of paper to contact through holes punched in the tape when compressed. It can easily separate from the paper to which it adheres and thus allow disassembly of stacked devices and it is inexpensive and widely available.

In certain embodiments of the above-mentioned aspects, a heat-activated adhesive can be used to seal the fluid-carrying layers together. Indeed, any fluid-impermeable material that can be cut and stuck to the pattern hydrophilic layers can be used. In addition, it is also possible to use the same material that is used to pattern the paper layers to stick the layers of paper together. In one or more embodiments, a layer of photoresist is disposed between two adjacent patterned porous, hydrophilic layers.

In certain embodiments of the above-mentioned aspects, the porous, hydrophilic material filling the aperture or opening could be the same material as the porous, hydrophilic layers or different material. Non-limiting examples of porous, hydrophilic material include chromatographic paper, filter paper, nitrocellulose and cellulose acetate, cellulosic paper, filter paper, paper towels, toilet paper, tissue paper, notebook paper, KimWipes, VWR Light-Duty Tissue Wipers, Technicloth Wipers, newspaper, and any paper that does not include binders.

In one or more embodiments, hydrophobic barriers can be provided in porous, hydrophilic layers using patterning methods that require relatively little equipment, can be performed in nearly any laboratory, and are versatile enough for making many types of patterns and multiple copies of each pattern. Because of the relative ease of fabrication and the ready availability of inexpensive components, bioassay devices can be formed with significantly lower cost than conventional devices such as dipsticks, and thus can be useful, among other things, for detecting disease in remote locations, where resources are limited, and where cost and portability of the devices are useful.

As noted above, in order to fabricate microfluidic channels in porous, hydrophilic media, such as, but not limited to paper, the patterned hydrophobic polymer generally extends substantially through the entire thickness of the paper in order to confine the liquid within desired areas. This constraint limits the methods that can be used in practice for patterning paper. For example, printing methods using standard inks may not be suitable for making channels in paper because currently available inks are designed to adhere to the surface of paper, not to absorb into the paper. However, it can be envisioned that certain inks could be designed in order to absorb substantially through the thickness of paper.

The composition of the porous medium, e.g., paper, may also limit the patterning methods that can be used in practice. For example, paper typically includes intertwined fibers that are oriented in the x- and y-axes of a sheet of paper and that are stacked on top of one another in the z-direction. The result of this arrangement is the increased spreading of liquids in the x-, y-plane compared to the z-direction, which leads to blurring of the features that were patterned. Appropriate choices of monomers, polymers, and solvents can be made to overcome these properties of paper, and to enable the patterning of distinct features that pass through the entire thickness of paper.

Some useful methods for patterning paper are based on photolithography, and can be implemented either in a cleanroom or in a laboratory. Cleanroom photolithography works well for making highly defined patterns in paper, but is relatively expensive and slow, possibly making its commercial viability somewhat limited. Other methods, such as laboratory photolithography and soft lithography (also called micro-contact printing), eliminate the need for a cleanroom, and have only modest requirements for equipment and expertise on the part of the manufacturer, while still producing high-quality devices. Laboratory photolithography is useful for making patterns, with well-resolved channels and small feature sizes. Soft lithography is typically less expensive than the photolithographic-based methods, and is useful for making multiple copies of the same pattern relatively quickly.

For some applications, the feature sizes in paper microfluidic devices are relatively large (e.g., with channels about 1-2 mm wide), so a lower resolution, but faster stamping technique will be sufficient. For other applications, micron-sized features will be used, and so an inexpensive, but higher-resolution method will be useful. For most applications the devices will have features with sizes less than 1.5 mm. It should be recognized however that a wide variety of channel shapes and sizes can be formed using the systems and methods described herein. In both kinds of applications, it is desirable that the patterning method be inexpensive, have high-throughput, and not require a highly technically skilled user to manufacture.

In one or more embodiments, hydrophobic patterns are generated using cleanroom photolithography. For example, chromatographic paper is patterned photolithographically using photoresist to create hydrophobic barriers within the paper.

The following example are provided to illustrate the invention, which is not intended to be limiting of the invention, the scope of which is set forth in the claims which follow.

EXAMPLE 1

Patterning Paper

The layers of patterned hydrophilic paper are provided following the procedures described in PCT/US07/081848. The patterns for the paper-based microfluidic devices were designed using the layout editor CleWin.

EXAMPLE 2

Microfluidic Flow Control Devices with Logic Gates

Microfluidic flow control devices with logic gates are assembled using layers of patterned hydrophilic paper and layers of fluid-impermeable medium with filled or unfilled openings described above.

Microfluidic flow control devices with AND and OR Logic Gates are described. These logic gates can be designed in 3-D paper devices using the 'on' button. As shown in FIG. 14, for both logic gates, two inputs A and B were designed and contain 'on' buttons designated by circles in the top layer of patterned paper (14A and 14E). When the inputs are compressed, they activate specific channels in the network.

The logic gates were designed with a source, where fluid is constantly supplied, two inputs A and B that are buttons, and an output, which is a well that either will fill with fluid if the input yields a true value (1), or will not fill with fluid if the input yields a false value (0). Four logic gates were placed on each device so that a complete truth table could be demonstrated for each logic function. The design of the AND gate comprises two 'on' buttons in series. In this configuration, fluid will flow from a source, through the network of channels and into the output, only if both the buttons are compressed. The design of the OR gate comprises two 'on' buttons in parallel. In this configuration, fluid will flow from the source and into the output well, if one or both buttons are compressed.

Figures 14A, 14B, 14C, 14D:
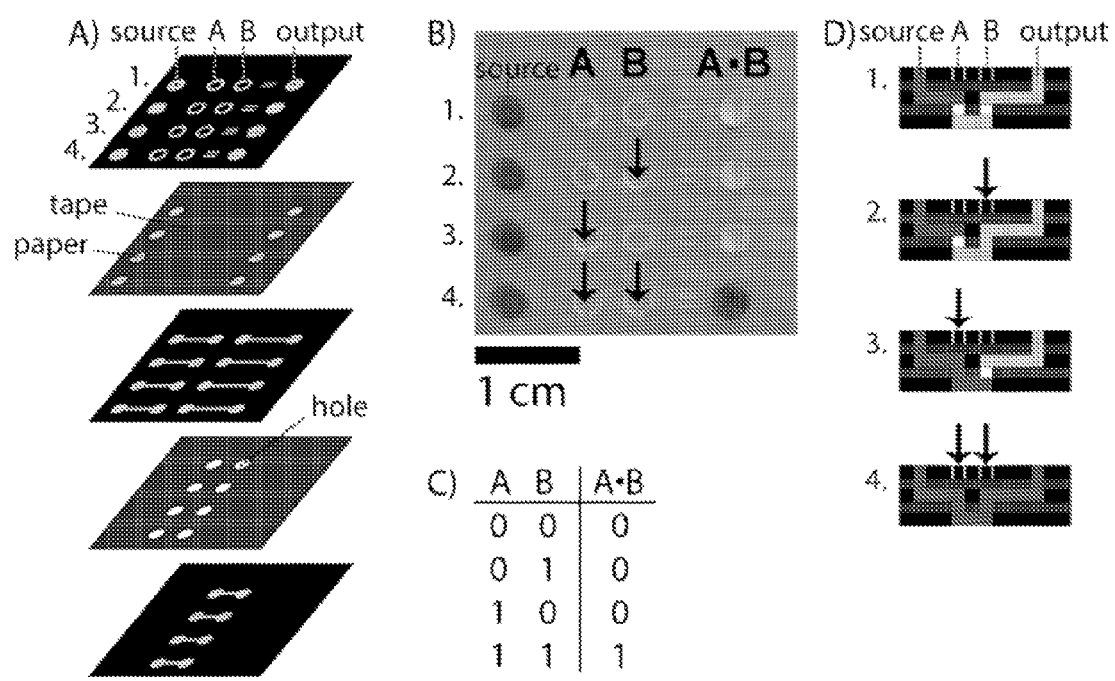
FIG. 14 illustrates three-dimensional microfluidic devices with AND and OR logic gates.

FIG. 14 shows a design for AND and OR logic gates. FIG. 14A is a schematic of the layers in the AND logic gate. Four logic gates were designed on each device so that a complete truth table could be shown for each function. FIG. 14B shows the assembled device after compressing the inputs in all possible combinations and adding an aqueous blue dye (1-mM erioglaucine) to the sources. In the described embodiment, the fluid takes 10 minutes to flow from the source to the output. FIG. 14C is the AND gate truth table. Compressing A or B is equivalent to an input of 1, and not compressing is equivalent to an input of 0. An output of 1 is equivalent to fluid filling the output well. An output of 0 is evident by the lack of fluid in the output well. FIG. 14D shows a schematic of the cross section of the AND logic gate. The two 'on' buttons are arranged in series so that fluid will reach the output only if both buttons are compressed. Four cross sections are shown, one for each possible combination of inputs.

Figures 14E, 14F, 14G, 14H:
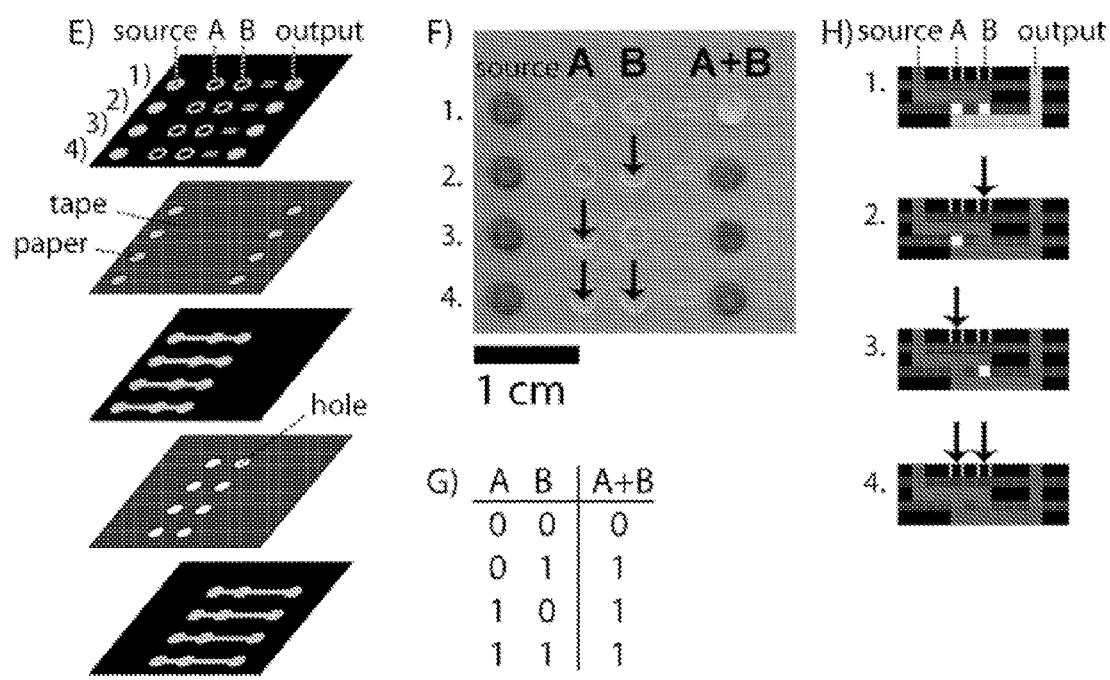

FIG. 14E is a schematic of the layers in the OR logic gate, and FIG. 14F shows the assembled device after compressing the buttons and adding blue dye to the sources. In the described embodiment, the fluid takes 10 minutes to flow from the source to the output. FIG. 14G is the OR gate truth table, and FIG. 14H shows a schematic of the cross section of the OR logic gate. The two 'on' buttons are arranged in parallel so that fluid will reach the output if either button is compressed.

Figure 15:
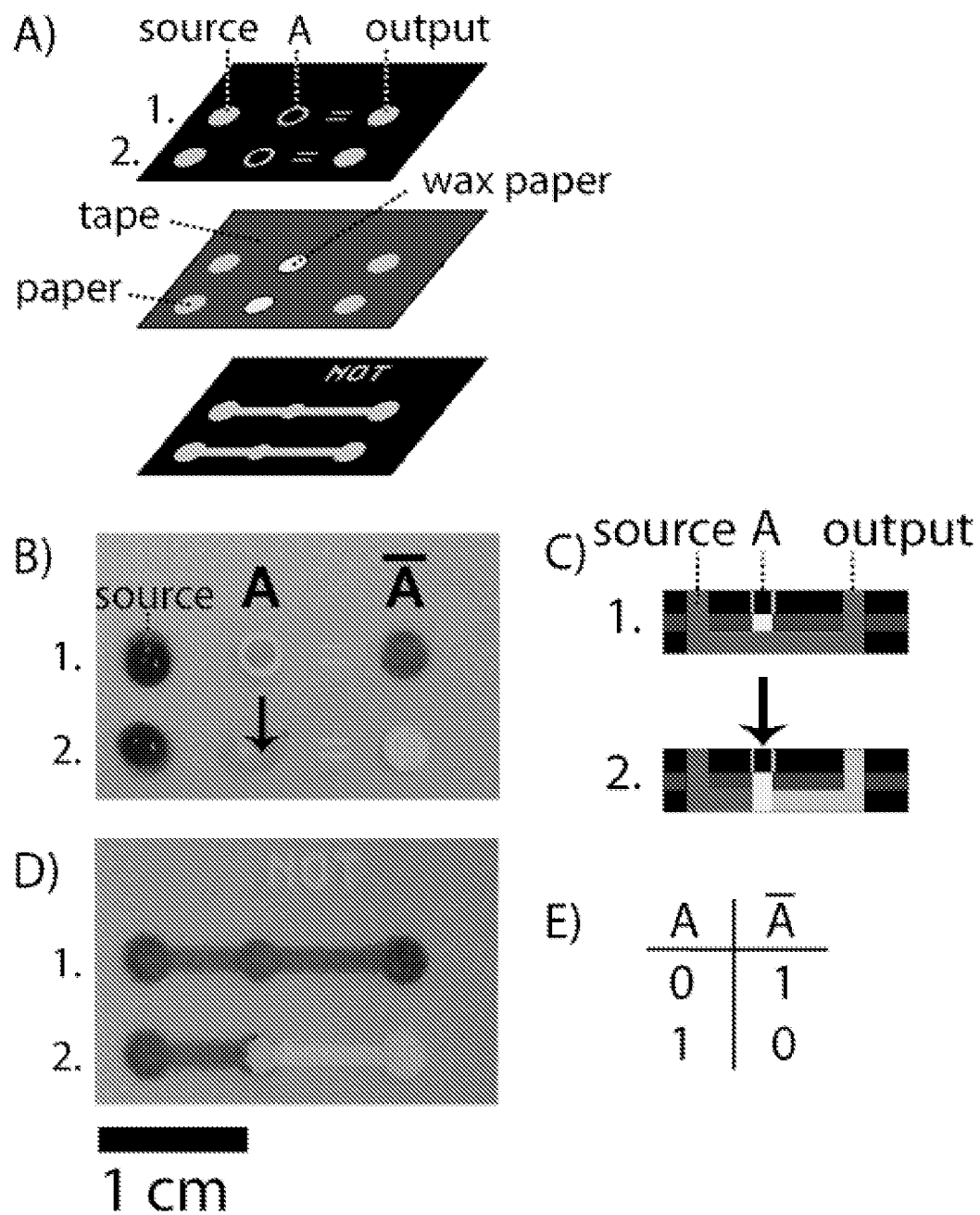
FIG. 15 illustrates a three-dimensional microfluidic device with NOT logic gate.

A microfluidic flow control device contains the function of a NOT logic gate is described with reference to FIG. 15. The 'on' button only allows for the design of AND and OR gates. A NOT gate requires an 'off' button. When compressed, an 'off' button blocks a channel and prevents fluid from flowing into it. The NOT gate only has one input, in this case one 'off' button. When the button is compressed, fluid is blocked from reaching the output. FIG. 15 shows a NOT gate. FIG. 15A illustrates the schematic of the layers in the device. Two NOT gates were designed on the device to show the two possible combinations of inputs. FIG. 15B shows the top of the device after compressing the button in second NOT gate and adding fluid to the source. Fluid only reaches the output if the button is not compressed. FIG. 15C shows the bottom of the device. In the second NOT gate, the fluid is blocked by wax in the channel. FIG. 15C shows a schematic of the cross section of the not gate. FIG. 15E shows the NOT gate truth table.

Figure 16:
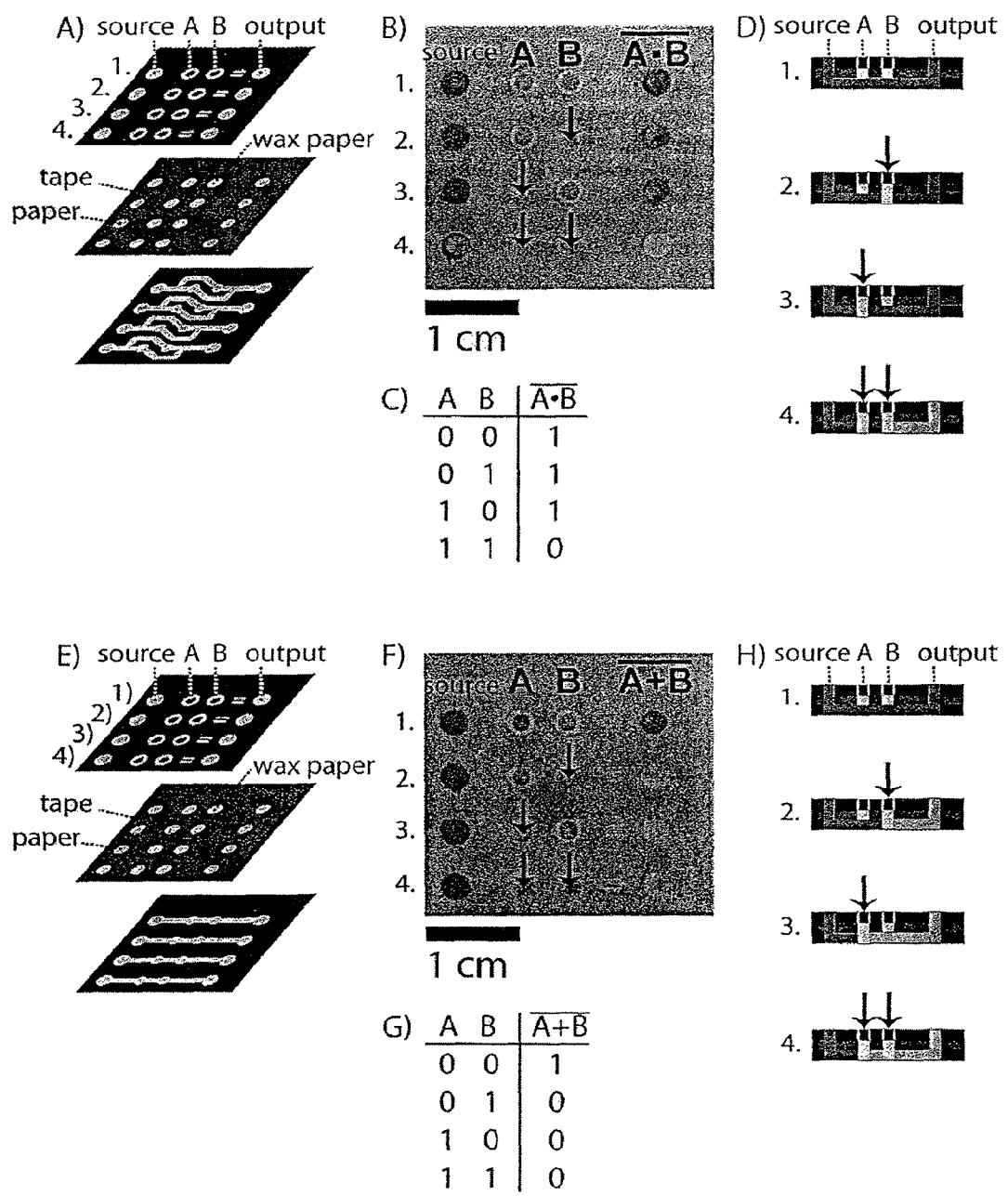
FIG. 16 illustrates three-dimensional microfluidic devices with NAND and NOR logic gates.

Microfluidic flow control devices contain the function of NAND and NOR logic gates are described with reference to FIG. 16. The NAND and NOR logic gates are the inverse of the AND and OR logic gates. The NAND gate can be achieved by designing two 'off' buttons in parallel, such that fluid will reach the output, unless both buttons are compressed. The NOR gate comprises two 'off' buttons in series, such that fluid will reach the output, only if both buttons are not compressed. FIG. 16 shows how NAND and NOR gates can be made. In FIG. 16A we show a schematic of the layers in the NAND logic gate. FIG. 16B shows the assembled device after compressing the inputs in all possible combinations and adding blue dye to the sources. In the described embodiment, the fluid takes 5 minutes to flow from the source to the output. FIG. 16C is the NAND gate truth table. In FIG. 16D we show the schematic of the cross section of the NAND logic gate.

FIG. 16E is a schematic of the layers in the NOR logic gate. The assembled device after compressing the buttons and adding blue dye to the sources is shown in FIG. 16F. In the described embodiment, the fluid takes 3 minutes to wick from the source to the output. FIG. 16G is the NOR gate truth table and FIG. 16H shows a schematic of the cross section of the NOR logic gate.

Figures 17A, 17B, 17C, 17D:
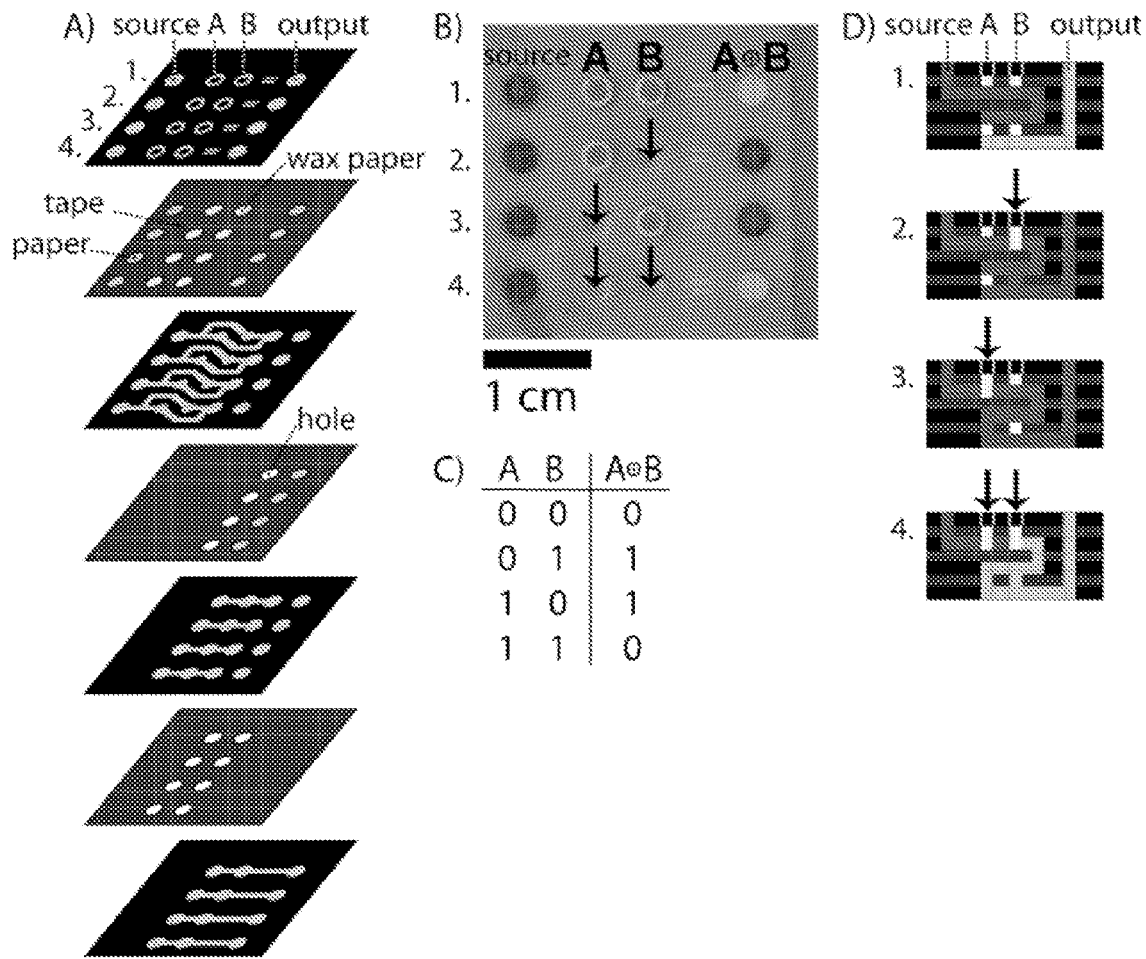
FIG. 17 illustrates three-dimensional microfluidic devices with XOR and XNOR logic gates.

Microfluidic flow control devices contain the function of XOR and XNOR logic gate is described with reference to FIG. 17. The XOR gate can be achieved by a combination of a NAND and an OR gate in series. The XNOR is the combination of a NOR and an AND gate in parallel. FIG. 17 show the schematics and implementations of XOR and XNOR gates. FIG. 17A is a schematic of the layers in the XOR logic gate. The XOR gate comprises a NAND gate and an OR gate in series. FIG. 17B shows the assembled device after compressing the inputs in all possible combinations and adding blue dye to the sources. In the described embodiment, the fluid takes from 5 to 20 minutes to wick from the source to the output. FIG. 17C shows the XOR gate truth table, and FIG. 17D is a schematic of the cross section of the XOR logic gate.

Figures 17E, 17F, 17G, 17H:
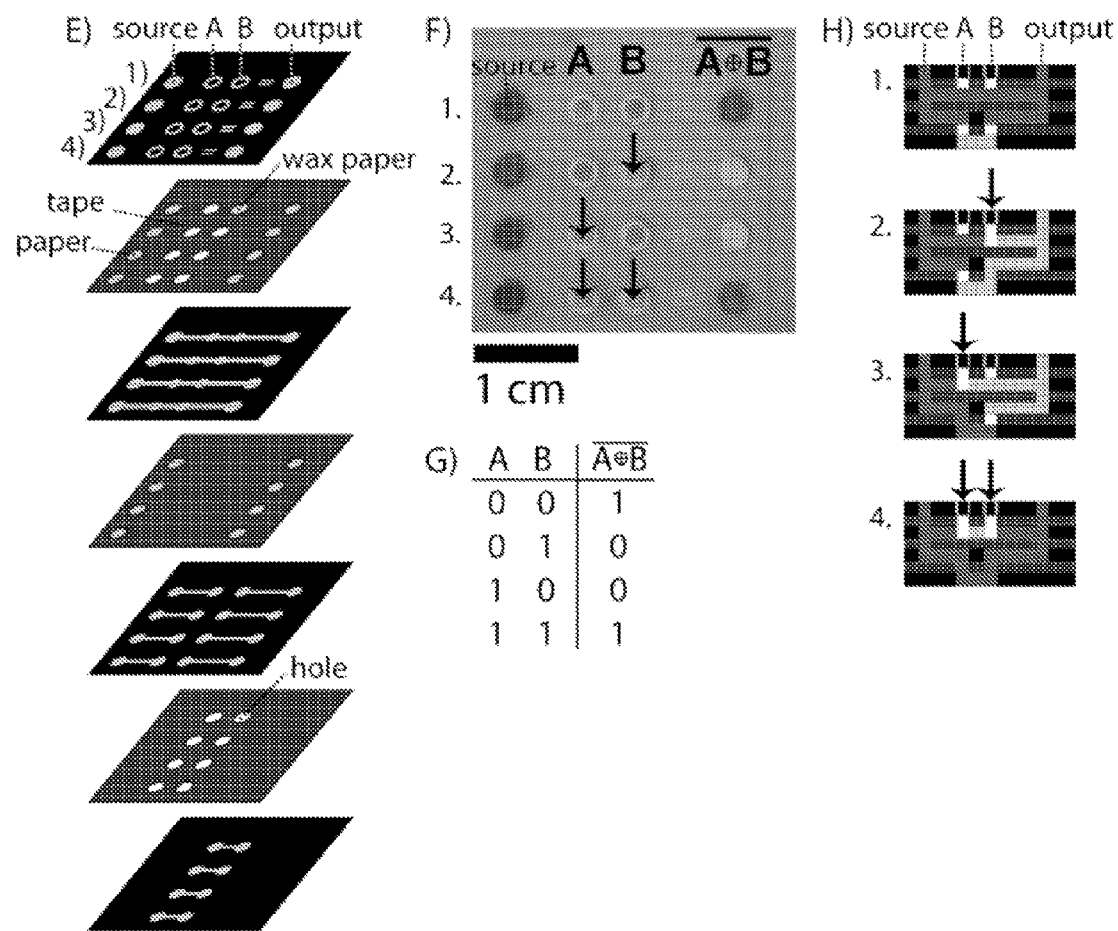

FIG. 17E is a schematic of the layers in the XNOR logic gate. The XNOR logic gate is comprised of a NOR gate and an AND gate in parallel. FIG. 17F shows the assembled device after compressing the buttons and adding blue dye to the sources. In the described embodiment, the fluid takes from 3 to 20 minutes to wick from the source to the output. FIG.

17G is the XNOR gate truth table, and FIG. 17H is a schematic of the cross section of the XNOR logic gate.

EXAMPLE 3

Microfluidic Flow Control Devices as De-multiplexer

Microfluidic de-multiplexer is assembled using layers of patterned hydrophilic paper and layers of fluid-impermeable medium with filled or unfilled openings described above.

Figure 18:
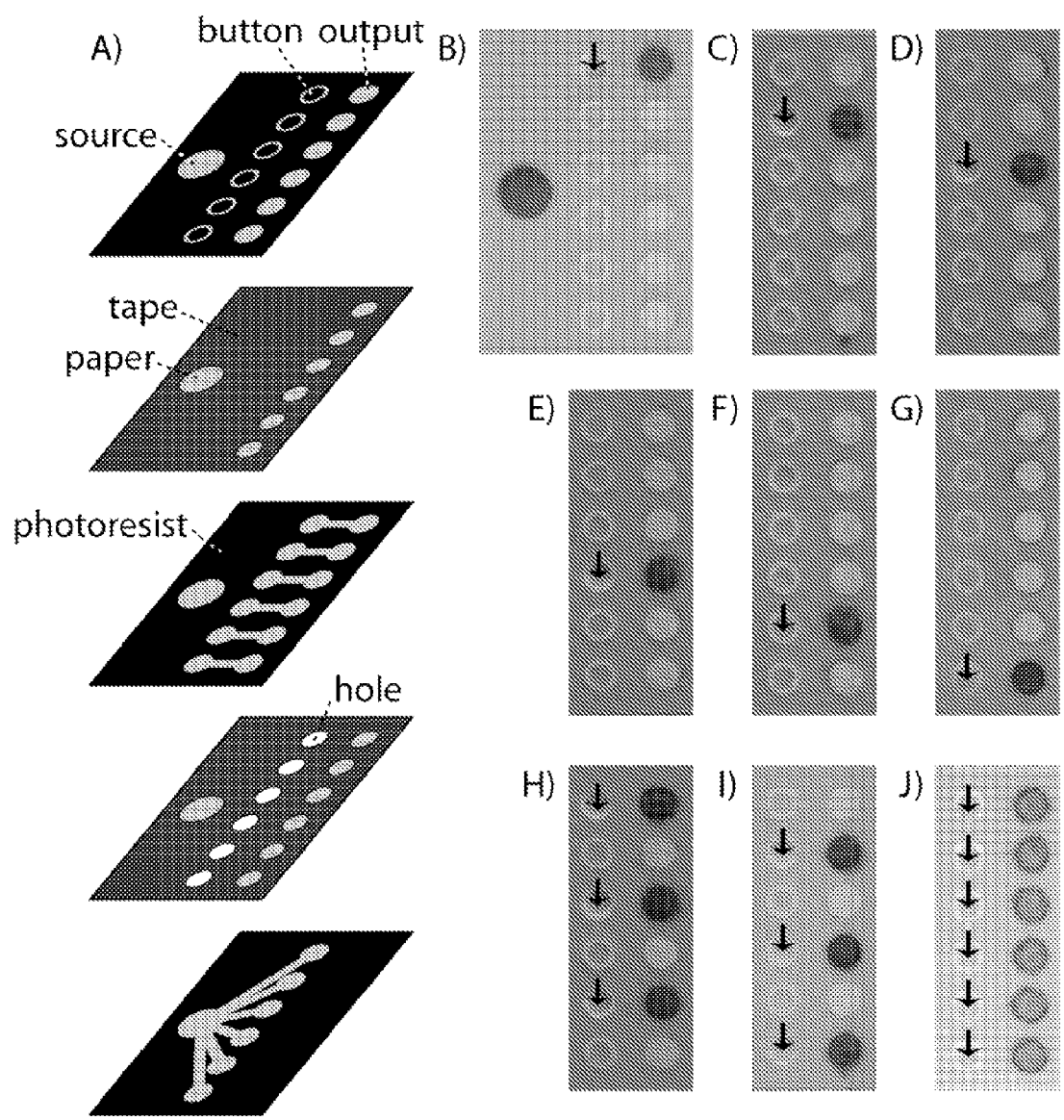
FIG. 18 illustrates a three-dimensional microfluidic de-multiplexer.

One of the applications of 'on' and 'off' buttons is the ability to direct fluids into specific channels or zones. A microfluidic de-multiplexer based this principle is described with reference to FIG. 18 which includes one inlet for a fluid and six different outputs. The output is controlled by an 'on' button that is placed next to each output. FIG. 18 shows a fluidic de-multiplexer. This device can be used to direct fluid from a single source into any number of outputs, in this case six outputs. The device is comprised of a source for fluid, six 'on' buttons, and six output wells. The output is determined by the buttons. FIG. 18A is a schematic of the layers in the demultiplexer, which is assembled using layers of patterned paper with defined hydrophilic regions and layers of tape with holes unfilled or filled with discs of paper. The unfilled holes within the devices function as "on" buttons described above. FIG. 18B shows an assembled de-multiplexer after compressing the first button (indicated by the arrow) and adding fluid to the source. In the described embodiment, only the first output is filled with fluid even after 30 minutes. FIGS. 18C-18J are pictures of de-multiplexers after compressing different buttons or combinations of buttons and adding fluid to the source. Each picture shows a different device.

A similar approach can be used to construct a multiplexer that has several inputs and allows the user to choose which one will be directed to a single output.

The invention claimed is:

1. A three-dimensional device for assay of a fluid sample, the device comprising at least first and second stacked, porous, hydrophilic layers each of which comprise a pattern of fluid-impermeable barriers that substantially permeate the thickness of the layer to define boundaries within each said layer of one or more porous hydrophilic regions of said hydrophilic layers that wick fluids laterally by capillary action through the porous hydrophilic regions of said hydrophilic layers;
   a fluid-impermeable layer disposed between said first and second layers defining one or more openings communicating vertically between hydrophilic regions in separate layers, said opening being in fluidic contact with at least one of said porous hydrophilic regions within each of said first and second layers;
   a porous hydrophilic medium disposed in a said opening in fluidic contact with at least one of said hydrophilic regions within each of said first and second layers; and
   one or more reagents disposed in fluid communication with a said hydrophilic region and with a detection zone in a hydrophilic region for colorimetrically detecting the presence of an analyte in a said detection zone.

2. The device of claim 1 further comprising at least a third porous, hydrophilic layer separated from an adjacent porous, hydrophilic layer by a fluid-impermeable layer and in fluid communication with a hydrophilic region in one of said first and second layers.

3. The device of claim 1 further comprising a fluid-impermeable layer on the outside of a said porous, hydrophilic layer defining an opening to permit application of a sample to said device.

4. The device of claim 1 further comprising a filter in fluid communication with a said hydrophilic region to remove solid contaminants from a sample or to remove red blood cells from a blood sample.

5. The device of claim 1 comprising plural separate hydrophilic regions and multiple separate detection zones thereby to permit conducting multiple assays simultaneously.

6. The device of claim 1 further comprising a plug filling one or more said openings and in direct contact with at least a portion of one of said hydrophilic regions to provide local temperature control, to provide reagents for assaying a sample, to filter a sample, or to modulate sample flow.

7. The device of claim 1 wherein said one or more openings in fluid communication with one of said layers in the device contains a chemical or biological reagent, an indicator, a binder, a fluid flow-impeding agent, a fluid flow-promoting agent, magnetic particles, a gel which swells when in contact with fluid, a fluid-mixable material which dissolves when in contact with fluid to allow microfluidic communication, a salt which either absorbs heat or gives off heat when in contact with fluid, a low-melting-point hydrophobic material capable of melting and flowing at a pre-selected temperature to flow into and thereby substantially obstruct microfluidic flow within a said hydrophilic region, or a combination thereof.

8. The device of claim 1 wherein at least one of said first and second layers is infused with a chemical or biological reagent, an indicator, a binder, a fluid flow-impeding agent, a fluid flow-promoting agent, magnetic particles, a gel which swells when in contact with fluid, a fluid-mixable material which dissolves when in contact with fluid to allow microfluidic communication, a salt which either absorbs heat or gives off heat when in contact with fluid, a low-melting-point hydrophobic material capable of melting and flowing at a pre-selected temperature to flow into and thereby substantially obstruct microfluidic flow within a said hydrophilic region, or a combination thereof.

9. The device of claim 1 comprising different reagents stored in different said layers in fluid communication with said hydrophilic regions.

10. The device of claim 1 defining in one or more hydrophilic regions a reservoir for depositing a fluid sample; a distributing region for receiving said sample from said reservoir and distributing said sample; and an array of spaced apart regions for receiving said sample from said distributing region.

11. The device of claim 10 comprising an assaying reagent in fluid communication with multiple said spaced apart regions for assaying said sample.

12. The device of claim 1 wherein the boundaries of a said hydrophilic regions define fluidic paths which cross laterally in different layers without mixing.

13. The device of claim 1 wherein the boundaries of at least one of said hydrophilic regions in a layer define first and second fluidic flow channels which merge into a combination zone, a second layer comprises a said hydrophilic region comprising a mixing channel, and said fluid-impermeable layer defines an opening permitting fluid communication between said combination zone and said mixing channel.

14. The device of claim 13 wherein said combination zone is capable of being moved vertically into said opening from a first position spaced apart from and not in fluidic contact with said mixing channel into a second position in fluidic contact with said mixing channel.

15. The device of 1 wherein a said reagent comprises a protein assay reagent, a glucose assay reagent, a sodium acetoacetate assay reagent, a sodium nitrite assay reagent, or a combination thereof.

16. The device of claim 1 wherein an opening is bounded by spaced apart flow channels of hydrophilic regions in separate layers, at least a portion of one of said flow channel being capable of movement from a said spaced apart position into a second position in contact with the other said flow channel, wherein, in said spaced apart position, said one flow channel is not in fluidic communication with said other flow channel, and in said second, contact position, said one flow channel is in fluidic communication with said other flow channel through an opening.

17. The device of claim 1 wherein said porous, hydrophilic layers comprises sheets of paper, nitrocellulose, cellulose acetate, cloth, or porous polymer film.

18. The device of claim 1 wherein said pattern of fluid-impermeable barriers is produced by screening, stamping, printing or photolithography and comprises photoresist, poly (methylmethacrylate), an acrylate polymer, polystyrene, polyethylene, polyvinylchloride, or a photo-polymerizable monomer that forms a hydrophobic polymer.

19. A three-dimensional device for assay of a fluid sample, the device comprising at least first and second stacked, porous, hydrophilic layers each of which comprise a pattern of fluid-impermeable barriers that substantially permeate the thickness of the layer to define boundaries within each said layer of one or more hydrophilic regions of said hydrophilic layers that wick fluids laterally by capillary action through porous flow channels;
    a fluid-impermeable layer disposed between said first and second layers defining one or more openings;
    an opening being bounded by spaced apart flow channels of hydrophilic regions in separate layers, at least a portion of one of said flow channel being capable of movement from a said spaced apart position into a second position in contact with the other said flow channel, wherein, in said spaced apart position, said one flow channel is not in fluidic communication with said other flow channel, and in said second, contact position, said one flow channel is in fluidic communication with said other flow channel through an opening; and
    one or more reagents disposed in fluid communication with a said hydrophilic region and with a detection zone in a hydrophilic region for detecting the presence of an analyte in a said detection zone.

20. The device of claim 19 further comprising a porous hydrophilic medium disposed in a said opening in fluidic contact with at least one of said hydrophilic regions within each of said first and second layers.

21. A three-dimensional device for assay of a fluid sample, the device comprising at least first and second stacked, porous, hydrophilic layers each of which comprise a pattern of fluid-impermeable barriers that substantially permeate the thickness of the layer to define boundaries within each said layer of one or more hydrophilic regions of said hydrophilic layers that wick fluids laterally by capillary action through the porous hydrophilic regions of said hydrophilic layers;
    a fluid-impermeable layer disposed between said first and second layers defining one or more openings communicating vertically between hydrophilic regions in separate layers; and
    disposed in a said opening in fluid communication with a said layer, a chemical or biological reagent, an indicator, a binder, a fluid flow-impeding agent, a fluid flow-promoting agent, magnetic particles, a gel which swells when in contact with fluid, a fluid-mixable material which dissolves when in contact with fluid to allow microfluidic communication, a salt which either absorbs heat or gives off heat when in contact with fluid, a low-melting-point hydrophobic material capable of melting and flowing at a pre-selected temperature to flow into and thereby obstruct microfluidic flow within a said hydrophilic region, or a combination thereof.

22. The device of claim 21 further comprising a porous hydrophilic medium disposed in a said opening in fluidic contact with at least one of said hydrophilic regions within each of said first and second layers.

* * * * *

UNITED STATES PATENT AND TRADEMARK OFFICE
CERTIFICATE OF CORRECTION

PATENT NO. : 8,628,729 B2
APPLICATION NO. : 12/934499
DATED : January 14, 2014
INVENTOR(S) : Carrilho et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 123 days.

Signed and Sealed this
Twenty-second Day of September, 2015

Michelle K. Lee
*Director of the United States Patent and Trademark Office*